(12) United States Patent
Tsuji et al.

(10) Patent No.: US 6,285,513 B1
(45) Date of Patent: Sep. 4, 2001

(54) OPTICAL ELEMENT

(75) Inventors: Toshio Tsuji, Hino; Shigeru Hosoe, Hachioji, both of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/500,089

(22) Filed: Feb. 8, 2000

(30) Foreign Application Priority Data

Feb. 10, 1999 (JP) .................................................. 11-032643
Feb. 10, 1999 (JP) .................................................. 11-032644
Feb. 10, 1999 (JP) .................................................. 11-032645

(51) Int. Cl.$^7$ ........................... G02B 13/18; C08G 77/00; C08G 77/06

(52) U.S. Cl. ........................... 359/718; 359/708; 528/10; 528/12; 528/14; 528/15

(58) Field of Search .................... 359/708, 718, 359/719; 528/10, 12, 14, 15, 20, 25, 31, 33, 41, 42, 24; 428/447, 448, 446

(56) References Cited

U.S. PATENT DOCUMENTS 4,198,131 * 4/1980 Birdsall et al. .................. 351/160 R
4,568,566 * 2/1986 Tolentino ............................ 427/54.1
5,516,858 * 5/1996 Morita et al. ......................... 525/478
5,844,060 * 12/1998 Furuya et al. .......................... 528/30

FOREIGN PATENT DOCUMENTS

0682271-A1 * 11/1995 (EP) ................................ G02B/1/04
6298940-A * 10/1994 (JP) .

* cited by examiner

*Primary Examiner*—Scott J. Sugarman
*Assistant Examiner*—David N. Spector
(74) *Attorney, Agent, or Firm*—Finnegan, Henderson, Farabow, Garrett, & Dunner, L.L.P.

(57) ABSTRACT

An optical element, comprises a silicon based resin satisfying following three conditional formulas: (1) (number of silicon atoms residing as $R1SiO_{3/2}$ in the silicon based resin)/(total number of silicon atoms in the silicon based resin)$\geq 0$, (2) (number of silicon atoms residing as $SiO_{4/2}$ in the silicon based resin)/(total number of silicon atoms in the silicon based resin)$\geq 0$, (3) {(number of silicon atoms residing as $R1SiO_{3/2}$ in the silicon based resin)+(number of silicon atoms residing as $SiO_{4/2}$ in the silicon based resin)}$\times 100$/(total number of silicon atoms in the silicon based resin)$\geq 10\%$, wherein R1 represents a hydrogen atom, a hydroxyl group, an amino group, a halogen atom or an organic group.

20 Claims, No Drawings

OPTICAL ELEMENT

BACKGROUND OF THE INVENTION

The present invention relates to optical lenses.

Basic optical properties such as high light transmittance, high refractive index, low residual double refraction after molding, and the like are required for geometrical optical lenses which are employed in various cameras such as common cameras, single use cameras, video cameras, and the like, optical pickup units such as CD, CD-ROM, CD-Video, MO, CD-R, DVD, and the like, as well as OA equipment such as copiers, printers, and the like. In addition, general properties such as high thermal stability, high mechanical strength as well as hardness, low water absorption, high weather resistance, solvent resistance, and the like are also required. Further, for production at low cost, excellent moldability is required.

However, conventional molded optical lenses employing, for example, polymethyl methacrylate, polycyclohexyl methacrylate, polystyrene, polycarbonate, poly-4-methylpentene, norbornane based polymers, polyurethane resins, and the like have suffered from drawbacks such as low thermal stability, variation in optical properties due to high water absorption, high double refraction, and the like. As a result, conventional lenses have not sufficiently met the requirements listed above.

Furthermore, plastic lenses prepared employing polydiethylene glycol bisallyl carbonate have exhibited a low refractive index, as well as heat resistance which is not as high as inorganic glass.

Furthermore, in recent years, while high density recording systems, employing CD-R, DVD, MO, and the like, have been increasingly investigated and have been put into practice, more enhancement in recording density has been attempted by shortening the wavelength of the recording light source. Many of the aforementioned polyolefin based, polycarbonate based, and acrylic based resin materials exhibit very low spectral transmittance in the region of ultraviolet rays and do not transmit any of said ultraviolet rays. In addition, these resins have problems in which their degradation is accelerated due to the breakage of the polymer chain bond constituting their structure by ultraviolet rays.

Namely, in the future high density light recording, optical lenses which have high spectral transmittance for the ultraviolet region as well as excellent moldability are highly required.

Further, the technique to produce a plastic lens comes to its limit in terms of the reduction of the manufacturing cost and the formation of a more miniature lens under a current circumstance.

That is, in a current manufacturing apparatus, a resin material is melted before the resin material is poured into a mold, and then the melted resin material is put into the mold with a pressure. For such the production, a thermally plasticizing apparatus is required. Further, since the temperature distribution of the resin in the mold needs a high accuracy, a high precise temperature control device is needed to conduct a temperature control such that the temperature deviation is kept within 1° C. or less. Further, it is necessary to apply a pressure required for a lens performance equally to overall of the lens. In order to apply the pressure equally, it may be difficult to produce a large number of lenses at a time in a predetermined sized mold with a single set of the thermally plasticizing apparatus. Also, the more a number of lenses produced at a time becomes, the larger a force required to remove the produced lens from the mold becomes.

Under the above restriction, the current production is in the situation that it may be difficult to lower its production cost less than the current cost. Further, due to the necessity of the above equal pressure, if a diameter of a lens becomes smaller, it is necessary to make the sectional area of a gate to pour the resin smaller. In this case, when it is necessary to make the gate smaller, for example, less than 3 mm square, it may be difficult to obtain an uniform pressure with a reverse proportion to the size of the gate. Of course, since there is a physical limitation in making the gate smaller, the miniaturization of the lens comes almost its limit under a current circumstance.

SUMMARY OF THE INVENTION

An object of the present invention is to provide an optical lens which is excellent in basic optical properties such as double refraction, light transmittance, and the like, and is suitable for the various cameras such as common cameras, single use cameras, video cameras, and the like, as well as optical pickup units such as CD, CD-ROM, CD-Video, MO, DVD, and also for the like, and OA equipment such as copiers, printers, and the like, which require high reliability as well as high performance. Further, another object is to obtain an optical lens having a high spectral transmission rate in the ultraviolet region. Also, another object is to obtain a miniature sized optical element made of a silicon based resin. Still further, another object is to obtain an optical lens for which production process can produce a large number of lenses at a time at a low cost.

The aforementioned object has been able to be accomplished employing the following embodiments of the present invention.

(1) An optical element, comprising:
    a silicon based resin satisfying following conditional formulas:
       (number of silicon atoms residing as $R1SiO_{3/2}$ in the silicon based resin)/(total number of silicon atoms in the silicon based resin)$\geq 0$
       (number of silicon atoms residing as $SiO_{4/2}$ in the silicon based resin)/(total number of silicon atoms in the silicon based resin)$\geq 0$
       {(number of silicon atoms residing as $R1SiO_{3/2}$ in the silicon based resin)+(number of silicon atoms residing as $SiO_{4/2}$ in the silicon based resin)}$\times 100$/(total number of silicon atoms in the silicon based resin)$\geq 10\%$
    wherein R1 represents a hydrogen atom, a hydroxyl group, an amino group, a halogen atom or an organic group.

(2) In the optical element of (1), the optical element is an optical lens.

(3) In the optical element of (2), the optical lens comprises optical surfaces at least one of which is shaped in a aspherical surface.

(4) In the optical element of (1), the silicon based resin satisfies following conditional formulas:
    (number of silicon atoms residing as $R1SiO_{3/2}$ in the silicon based resin)/(total number of silicon atoms in the silicon based resin)$\geq 0$
    (number of silicon atoms residing as $SiO_{4/2}$ in the silicon based resin)/(total number of silicon atoms in the silicon based resin)$\geq 0$
    {(number of silicon atoms residing as $R1SiO_{3/2}$ in the silicon based resin)+(number of silicon atoms residing as $SiO_{4/2}$ in the silicon based resin)}×100/(total number of silicon atoms in the silicon based resin)≧20%.

(5) In the optical element of (1), wherein the silicon based resin satisfies a following conditional formula:

(number of silicon atoms residing as $R1SiO_{3/2}$ in the silicon based resin)≧(number of silicon atoms residing as $SiO_{4/2}$ in the silicon based resin).

(6) In the optical element of (1), the silicon based resin satisfies a following conditional formula:

(number of silicon atoms residing as $R1SiO_{3/2}$ in the silicon based resin)<(number of silicon atoms residing as $SiO_{4/2}$ in the silicon based resin).

(7) In the optical element of (1), the silicon based resin satisfies a following conditional formula:

5%≦(number of silicon atoms residing as $R1SiO_{3/2}$ in the silicon based resin)×100/(number of silicon atoms residing as $SiO_{4/2}$ in the silicon based resin)≦90%.

(8) In the optical element of (1), 15 to 100 mol % of substituents bonded to silicon atoms contained in the silicon based resin is an aromatic groups.

(9) In the optical element of (1), 20 to 100 mol % of substituents bonded to silicon atoms contained in the silicon based resin is an alkyl group.

(10) In the optical element of (9), the alkyl group is a methyl group.

(11) In the optical element of (1), 20 to 100 mol % of substituents bonded to silicon atoms contained in the silicon based resin is a hydrogen atom.

(12) In the optical element of (1), a hardness of the optical element according to JIS-A is not smaller than 85.

(13) In the optical element of (1), the silicon based resin satisfies following conditional formulas:

(number of silicon atoms residing as $R1SiO_{3/2}$ in the silicon based resin)/(total number of silicon atoms in the silicon based resin)>0

(number of silicon atoms residing as $SiO_{4/2}$ in the silicon based resin)/(total number of silicon atoms in the silicon based resin)≧0

{(number of silicon atoms residing as $R1SiO_{3/2}$ in the silicon based resin)+(number of silicon atoms residing as $SiO_{4/2}$ in the silicon based resin)}×100/(total number of silicon atoms in the silicon based resin)≧10%.

(14) In the optical element of (13), the optical element is an optical lens whose minimum effective radius is 0.03 mm to 3.00 mm.

(15) In the optical element of (13), the optical element is an optical lens whose volume is not larger than 100 $mm^3$.

(16) In the optical element of (1), the silicon based resin satisfies a following conditional formula:

5%≦(number of silicon atoms residing as $R2R3SiO_{2/2}$ in the silicon based resin)×100/(total number of silicon atoms in the silicon based resin)≦60%.

wherein R2 and R3 are the same or different from each other and and R2 and R3 represent a hydrogen atom, a hydroxyl group, an amino group a halogen atom or an organic group.

(17) In the optical element of (1), the silicon based resin satisfies following conditional formulas:

(number of silicon atoms residing as $R1SiO_{3/2}$ in the silicon based resin)×100/(total number of silicon atoms in the silicon based resin)=0%

(number of silicon atoms residing as $SiO_{4/2}$ in the silicon based resin)×100/(total number of silicon atoms in the silicon based resin)≧10%.

(18) In the optical element of (1), the silicon based resin satisfies a following conditional formula:

10%≧(number of silicon atoms residing as $SiO_{4/2}$ in the silicon based resin)×100/(total number of silicon atoms in the silicon based resin)≧90%.

(19) In the optical element of (18), the silicon based resin satisfies a following conditional formula:

30%≦(number of silicon atoms residing as $SiO_{4/2}$ in the silicon based resin)×100/(total number of silicon atoms in the silicon based resin)≦70%.

(20) In the optical element of (1), the silicon based resin is a silicone resin.

Further, the aforementioned object may also be accomplished employing the following preferred embodiments.

A-1. An optical lens characterized in comprising a silicon based resin which satisfies the following Conditional Expression.

(Number of silicon atoms having a structure of $R1SiO_{3/2}$)/(number of total silicon atoms)>0

(Number of silicon atoms having a structure of $SiO_{4/2}$)/(number of total silicon atoms)>0

{(Number of silicon atoms having a structure of $R1SiO_{3/2}$)+(Number of silicon atoms having a structure of $SiO_{4/2}$)}×100/(number of total silicon atoms)≧20% wherein R1 represents a hydrogen atom, a hydroxyl group, an amino group, a halogen atom or an organic group.

A-2. The optical lens described in A-1 above, characterized in satisfying the following Conditional Expression:

(Number of silicon atoms having a structure of $R1SiO_{3/2}$)≧(Number of silicon atoms having a structure of $R1SiO_{4/2}$ A-3. The optical lens described in A-1 above, characterized in satisfying the following Conditional Expression:

(Number of silicon atoms having a structure of $R1SiO_{3/2}$)<(Number of silicon atoms having a structure of $R1SiO_{4/2}$ A-4. The optical lens described in A-1 above, characterized in satisfying the following Conditional Expression:

10%≦(Number of silicon atoms having a structure of $R1SiO_{3/2}$)× 100/(number of total silicon atoms)≦90%

A-5. The optical lens described in any one of A-1 through A-4, characterized in that 5 to 100 mol % of substituents bonded to silicon atoms contained in the aforementioned silicon based resin are aromatic groups.

A-6. The optical lens described in any one of A-1 through A-4 above, characterized in that at least 20 mol percent of substituents bonded to silicon atoms contained in the aforementioned silicon based resin are alkyl groups.

A-7. The optical lens described in A-6 above, characterized in that said alkyl group is a methyl group.

A-8. The optical lens described in any one of A-1 through A-4 above, characterized in that at least 20 mol percent of substituents bonded to silicon atoms contained in the aforementioned silicon based resin are hydrogen atoms.

A-9. The optical lens described in any one of A-1 through A-4 or A-6 through A-8 above, characterized in that the aforementioned silicon based resin is comprised of a composition containing organopolysiloxane represented by the average compositional formula of $R2_a(C_nH_{2n+1})_bSiO_{(4-a-b)/2}$, wherein R2 represents a hydrogen atom, a hydroxyl group, an amino group, a halogen atom or an organic group, other than any alkyl group, a>0, b>0, 0<a+b<2, and n represents a positive integer.

A-10. The optical lens described in A-9 above, characterized in that n is 1 in said average compositional formula of $R2_a(C_nH_{2n+1})_bSiO_{(4-a-b)/2}$.

A-11. The optical lens described in A-9 or A-10 above, characterized in that said organopolysiloxane comprises an alkenyl group.

A-12. The optical lens described in any one of A-1 through A-4 or A-8 above, characterized in that the aforementioned silicon based resin is comprised of a composition containing organopolysiloxane represented by the average composition formula of $R_c(H)_dSiO_{(4-c-d)/2}$, wherein R3 represents a hydroxyl group, an amino group, a halogen atom or an organic group, c>0, d>0, 0<c+d<2.

A-13. The optical lens described in any one of A-1 through A-4 or A-6 through A-12 above, characterized in having a spectral transmittance of at least 80 percent in the region of 250 to 900 nm.

A-14. The optical lens described in any one of A-1 through A-13 above, characterized in that said silicon based resin is a silicone resin and said optical lens is comprised of said silicone resin.

A-15. The optical lens described in A-14 above, characterized in that said silicone resin is of a heat curing type and is prepared employing an addition reaction with a heat curing reaction.

A-16. The optical lens described in A-15 above, characterized in that a platinum compound is employed as a catalyst for said heat curing reaction.

A-17. The optical lens described in any one of A-1 through A-16 above, characterized in having a transmittance of at least 85 percent in the wavelength region of 400 to 850 nm.

A-18. The optical lens described in any one of A-1 through A-17 above, characterized in having a JIS-A Hardness of at least 85.

A-19. The optical lens described in any one of A-1 through A-18 above, characterized in that at least one of the optical surfaces is aspheric.

A-20. The optical lens described in A-19 above, characterized in that both of the optical surfaces are aspheric.

B-1. An optical lens characterized in comprising a silicon based resin satisfying the following Conditional Expression, and having a minimum effective radius of the optical surface between at least 0.03 mm and no more than 3.00 mm.

(Number of silicon atoms having a structure of $R1SiO_{3/2}$)/(number of total silicon atoms)>0 (Number of silicon atoms having a structure of $SiO_{4/2}$)/(number of total silicon atoms)≧0

{(Number of silicon atoms having a structure of $R1SiO_{3/2}$)+(number of silicon atoms having a structure of $SiO_{4/2}$)}×100/(number of total silicon atoms)≧5% wherein R1 represents a hydrogen atom, a hydroxyl group, an amino group, a halogen atom or an organic group.

B-2. The optical lens described in B-1 or B-2 above, characterized in having a volume of said optical lens of no more than 100 mm³.

B-3. The optical lens described in B-1 above, characterized in satisfying 5%≦(number of silicon atoms having a structure of $R1SiO_{3/2}$×100)/(number of total silicon atoms) ≦90%.

B-4. The optical lens described in B-1 or B-2 above, characterized in that said silicon based resin satisfies 5%≦ (number of silicon atoms having a structure of $R2R3_2SiO_{2/2}$×100)/(number of total silicon atoms)≦60%:

wherein R2 and R3 each independently represents a hydrogen atom, a hydroxyl group, an amino group a halogen atom or an organic group.

B-5. The optical lens described in any one of B-1 through B-4, characterized in that 15 to 100 mol % of substituents bonded to silicon atoms contained in the aforementioned silicon based resin is an aromatic group.

B-6. The optical lens described in any one of B-1 through B-4 above, characterized in that at least 20 mol % of substituents bonded to silicon atoms contained in the aforementioned silicon based resin is an alkyl group.

B-7. The optical lens described in B-6 above, characterized in said alkyl group is a methyl group.

B-8. The optical lens described in any one of B-1 through B-4 above, characterized in that at least 20 mol % of substituents bonded to silicon atoms contained in the aforementioned silicon based resin is a hydrogen atom.

B-9. The optical lens described in any one of B-1 through B-4 or B-6 through B-8 above, characterized in that the aforementioned silicon based resin is comprised of the composition containing organopolysiloxane represented by the average composition formula of $R4_a(C_nH_{2n+1})_bSiO_{(4-a-b)/2}$, wherein R4 represents a hydrogen atom, a hydroxyl group, an amino group, a halogen atom or an organic group other than any alkyl group, a>0, b>0, 0<a+b<2, and n represents a positive integer.

B-10. The optical lens described in B-9 above, characterized in that n is 1 in said average composition formula of $R2_a(C_nH_{2n+1})_bSiO_{(4-a-b)/2}$.

B-11. The optical lens described in B-9 or B-10 above, characterized in that said organopolysiloxane comprises an alkenyl group.

B-12. The optical lens described in any one of B-1 through B-4 or B-8 above, characterized in that the aforementioned silicon based resin is comprised of a composition containing organopolysiloxane represented by the average composition formula of $R5_c(H)_dSiO_{(4-c-d)/2}$, wherein R5 represents a hydroxyl group, an amino group, a halogen atom or an organic group, c>0, d>0, 0<c+d<2.

B-13. The optical lens described in any one of B-1 through B-4 or B-6 through B-12 above, characterized in having a spectral transmittance of at least 80 percent for radiation in the wavelength region of 250 to 900 nm.

B-14. The optical lens described in any one of B-1 through B-13 above, characterized in that said silicon based resin is a silicone resin, and said optical lens is comprised of said silicone resin.

B-15. The optical lens described in B-14 above, characterized in that said silicone resin is of a heat curing type and is prepared employing an addition reaction with a heat curing reaction.

B-16. The optical lens described in B-15 above, characterized in that a platinum compound is employed as a catalyst for said heat curing reaction.

B-17. The optical lens described in any one of B-1 through B-16 above, characterized in having a spectral transmittance of at least 85 percent for radiation in the wavelength range of 400 to 850 nm.

B-18. The optical lens described in any one of B-1 through B-17 above, characterized in having a JIS-A Hardness of at least 85.

B-19. The optical lens described in any one of B-1 through B-18 above, characterized in that at least one of the optical surfaces is aspheric.

B-20. The optical lens described in B-19 above, characterized in that both of the optical surfaces are aspheric.

C-1. An optical element characterized in comprising a silicon based resin having $SiO_{4/2}$ as a compositional unit and substantially having no $R1SiO_{3/2}$.

wherein R1 represents a hydrogen atom, a hydroxyl group, an amino group, a halogen atom or an organic group.

C-2. The optical element described in C-1 above, characterized in that 10 to 90 percent of silicon atoms comprised of the aforementioned silicon based resin is said $SiO_{4/2}$.

C-3. The optical element described in C-1 above, characterized in that 30 to 70 percent of silicon atoms comprised of the aforementioned silicon based resin is said $SiO_{4/2}$.

C-4. The optical element described in any one of C-1 through C-3, characterized in that 15 to 100 mol % of substituents bonded to silicon atoms contained in the aforementioned silicon based resin is an aromatic group.

C-5. The optical element described in any one of C-1 through C-3 above, characterized in that at least 20 mol % of substituents bonded to silicon atoms contained in the aforementioned silicon based resin is an alkyl group.

C-6. The optical element described in C-5 above, characterized in said alkyl group is a methyl group.

C-7. The optical element described in any one of C-1 through C-3 above, characterized in that at least 20 mol % of substituents bonded to silicon atoms contained in the aforementioned silicon based resin is a hydrogen atom.

C-8. The optical element described in any one of C-1 through C-3 or C-5 through C-7 above, characterized in that the aforementioned silicon based resin is comprised of the composition containing organopolysiloxane represented by the average composition formula of $R2_a(C_nH_{2n+1})_cSiO_{(4-a-c)/2}$, wherein R2 represents a hydrogen atom, a hydroxyl group, an amino group, a halogen atom or an organic group other than any alkyl group, a>0, b>0, 0<a+b<2, and n represents a positive integer.

C-9. The optical element described in C-8 above, characterized in that n is 1 in said average composition formula of $R2_a(C_nH_{2n+1})_bSiO_{(4-a-b)/2}$.

C-10. The optical element described in C-8 or C-9 above, characterized in that said organopolysiloxane comprises an alkenyl group.

C-11. The optical element described in any one of C-1 through C-3 or C-7 above, characterized in that the aforementioned silicon based resin is comprised of a composition containing organopolysiloxane represented by the average compositional formula of $R3_c(H)_dSiO_{(4-c-d)/2}$, wherein R3 represents a hydroxyl group, an amino group, a halogen atom or an organic group, c>0, d>0, 0<c+d<2.

C-12. The optical element described in any one of C-1 through C-4 or C-6 through C-11 above, characterized in having a spectral transmittance of at least 80 percent in the wavelength region of 250 to 900 nm.

C-13. The optical element described in any one of C-1 through C-12 above, characterized in that said silicon based resin is a silicone resin, and said optical element is comprised of said silicone resin.

C-14. The optical element described in C-13 above, characterized in that said silicone resin is of a heat curing type and is prepared employing an addition reaction with a heat curing reaction agent.

C-15. The optical element described in C-14 above, characterized in that a platinum compound is employed as a catalyst for said heat curing reaction.

C-16. The optical element described in any one of C-1 through C-15 above, characterized in having a spectral transmittance of at least 85 percent in the wavelength region of 400 to 850 nm.

C-17. The optical element described in any one of C-1 through C-16 above, characterized in having a JIS-A Hardness of at least 85.

C-18. An optical lens characterized in having a feature described in any one of C-1 to C-17 above.

C-19. The optical lens described in C-18 above, which is characterized in having that at least one of the optical surfaces is aspheric.

C-20. The optical lens described in C-19 above, characterized in that both of the optical surfaces are aspheric.

The present invention will now be detailed below.

The optical element of the present invention comprises silicon based resins satisfying Conditional Expressions (1), (2), and (3) below.

Conditional Expression (1) (Number of silicon atoms comprised as $(R1SiO_{3/2})$/(number of total silicon atoms comprised in said silicon based resin)>0

Conditional Expression (2) (Number of silicon atoms comprised as $(SiO_{4/2})$/(number of total silicon atoms comprised in said silicon based resin)>0

Conditional Expression (3) {(Number of silicon atoms comprised as $(R1SiO_{3/2})$+(number of silicon atoms comprised as $(SiO_{4/2})$)×100/(number of total silicon atoms comprised in said silicon based resin)≧10% wherein R1 represents a hydrogen atom, a hydroxyl group, an amino group, a halogen atom or an organic group.

Further, the silicon based resin as described herein means a resin comprising silicon atoms. By regulating the content of trifunctional siloxane $(R1SiO_{3/2})$ units as well as tetrafunctional siloxane $(SiO_{4/2})$ within the aforementioned specifications, an optical element may be obtained, which has high light transmittance, small double refraction, high thermal stability, and further, has high mechanical strength as well as high hardness, and low water absorption.

Further, the range of water absorption is preferably not larger than 1.0%. Still further, the range of water absorption is more preferably not larger than 0.1%. As the test for the water absorption, JIS K7209 may be preferably used. The range of double refraction preferably exhibits a phase difference of no more than 20 nm, and more preferably no more than 10 nm.

Furthermore, in order to obtain the desired low double refraction, molding is preferably carried under no pressure application, if possible. For example, injection type molding and the like may be cited.

Further, listed as optical elements are optical lenses, prisms, diffraction type optical elements, and the like. However, optical lenses are preferred. Further, optical lenses are particularly preferred which are small optical elements such as collimator lenses, coupling lenses, or objective lenses employed in the pickup of a light information recording medium reproducing and recording apparatus. Many of such small optical elements are molded in one step. Thus the effect of the present invention such as ease of production is markedly exhibited and further production cost may decrease. More specifically, optical lenses, having a minimum effective radius between 0.03 and 3.00 mm, or a volume of no more than 100 $mm^2$, are particularly preferred. Furthermore, at least one of the optical surfaces of the optical lenses may be aspheric. Further, both of the optical surfaces may be aspheric.

The minimum effective radius of the optical surface as described herein refers to the shortest distance between the outermost circumference of the effective optical surface and the gravity center of the projection to the plane vertical to the optical axis of the optical surface. For instance, viewed from the optical axis direction, the minimum effective radius refers to the distance between the outermost circumference of the circular optical surface and the circular center, which is its center of gravity, that is, the radius of the effective optical surface. Furthermore, in the case of a rectangular optical surface viewed from the optical axis direction, the minimum effective radius refers to the shortest distance between the outermost circumference of the optical surface on the long side of the rectangle and the center of gravity, that is, one half of the length of the short side. Other optical surfaces are treated in the same manner.

Specifically, when small lenses, as described above, are prepared employing a silicon based resin, the silicon based resin satisfying the following Conditional Expressions (4), (5), and (6) is preferably employed in order to improve the impact resistance.

Expression (4) (number of silicon atoms comprised as $R1SiO_{3/2}$)/(number of total silicon atoms comprised in said silicon based resin)>0

Expression (5) (number of silicon atoms comprised as $SiO_{4/2}$)/(number of total silicon atoms comprised in said silicon based resin)>0

Expression (6) {(number of silicon atoms comprised as $R1SiO_{3/2}$)+(number of silicon atoms comprised as $SiO_{4/2}$)}×100/(number of total silicon atoms comprised in said silicon based resin)≧10%

Namely, these expressions imply that the trifunctional siloxane units are comprised without fail and the tetrafunctional siloxane units may not be comprised, but the ratio of the number of the sum of silicon atoms of both to the total silicon atoms is at least 10 percent.

Furthermore, employed as silicon based resins of the optical element may be silicon based resins which satisfy the following Conditional Expressions (7), (8), and (9):

Expression (7) (number of silicon atoms comprised as $R1SiO_{3/2}$)/(number of total silicon atoms comprised in said silicon based resin)>0

Expression (8) (number of silicon atoms comprised as $(SiO_{4/2})$/(number of total silicon atoms comprised in said silicon based resin)>0

Expression (9) {(number of silicon atoms comprised as $(R1SiO_{3/2})$+(number of silicon atoms comprised as $(SiO_{4/2})$}×100/(number of total silicon atoms comprised in said silicon based resin)≧20%

Namely, these expressions imply that trifunctional siloxane units, as well as tetrafunctional siloxane units are comprised without fail and the number of the sum of silicon atoms of both is at least 20 percent with respect to the number of total silicon atoms.

By employing those described above as silicon based resins, an optical element may be obtained which has still lower double refraction, higher thermal stability, higher mechanical strength, and higher hardness.

Further, when further enhancement of impact resistance is critical as an optical element, the silicon based resins, which satisfy the following Conditional Expressions (10), are preferably employed.

Expression (10) (number of silicon atoms comprised as $R1SiO_{4/2}$)≧(number of silicon atoms comprised as $SiO_{4/2}$)

Further, preferred impact resistance is preferably in the range not less than 1.0 kg/cm². Still further, the impact resistance is more preferably in the range not less than 1.5 kg/cm². For the impact resistance, it may be preferable to measure it by Izod impact tester under JIS K7110. In order to satisfy the above range of the impact resistance, a gel weight % of the resin is preferably not larger than 1.0%, more preferably not larger than 0.1%. The gel weight % can be obtain such a way that the resin is extracted by a solvent and the weight of the elusion component is divided by the total weight.

Furthermore, by employing the silicon based resins which satisfy the following Conditional Expression (11), more improvement of the impact resistance as well as hardness may be expected.

Expression (11) 5%≦(number of silicon atoms comprised as $R2R3SiO_{2/2}$)×100/(number of total silicon atoms comprised in said silicon based resin)≦60% wherein R2 and R3 may be the same or different, and each independently represents a hydrogen atom, a hydroxyl group, an amino group, a halogen atom, or an organic group.

Further, when more enhancement of heat resistance is critical as an optical element, the silicon based resins, which satisfy the following Conditional Expressions (12), are preferably employed.

Expression (12) (number of silicon atoms comprised as $R1SiO_{3/2}$)<(number of silicon atoms comprised as $SiO_{4/2}$)

Further, cited as an index to show heat resistance is the thermal deformation temperature. The preferred thermal deformation temperature is in the range not lower than 100° C. The thermal deformation temperature is more preferably in the range not lower than 150° C. Incidentally, it may be preferable to measure the thermal deformation temperature by Vikat softening temperature tester under JIS K7206. Further, an upper limit temperature in the temperature range in which the thermal deformation of an optical surface of the optical element is not larger than 0.1 μm, is not lower than 100° C., more preferably not lower than 150° C.

Further, when more enhancement of impact resistance as well as hardness is critical as an optical element, silicon based resins, which satisfy the following Conditional Expression (13), are preferably employed:

Expression (13) 5%≦(number of silicon atoms comprised as $R1SiO_{3/2}$)×100/(number of total silicon atoms comprised in said silicon based resin)≦90%

Those, which satisfy the following Conditional Expression (14), are more preferably employed:

Expression (14) 10%≦(number of silicon atoms comprised as $R1SiO_{3/2}$)×100/(number of total silicon atoms comprised in said silicon based resin)≦90%

Those, which satisfy the following Conditional Expression (15), are most preferably employed.

Expression (15) 30% ≦(number of silicon atoms comprised as $R1SiO_{3/2}$)×100/(number of total silicon atoms comprised in said silicon based resin)≦70%

Further, as the optical element, JIS-A Hardness is preferably at least 85, and JIS-D Hardness is more preferably not smaller than 75. JIS-A Hardness and JIS-D Hardness are preferably measured by JIS K7215.

Furthermore, the optical element preferably has high light transmittance. By specifically enhancing the transmittance in the short region such ultraviolet region and the like, an optical lens which can suitably be employed together with a light source, which emits a short wavelength laser beam such as a blue laser beam and the like, can be obtained. Specifically, the optical element preferably has a transmittance of at least 85 percent in the region of 400 to 850 nm. Further, it preferably has a transmittance of at least 80 percent in the region of 250 to 900 nm.

In the silicon based resin, 20 to 100 mol percent of substituents bonded to silicon atoms are preferably comprised of alkyl groups to obtain higher transmittance. The particularly preferred alkyl group is a methyl group.

Furthermore, the optical element preferably has a high refractive index. The refractive index is preferably at least 1.5, and is more preferably at least 1.6.

In the silicon based resin, 15 to 100 mol percent of substituents bonded to silicon atoms are preferably comprised of aromatic groups to enable of obtaining a higher refractive index.

Furthermore, in the silicon based resin, 20 to 100 mol percent of substituents bonded to silicon atoms may be comprised of hydrogen atoms. With this structure, a light transmission rate in the short wavelength region is preferably improved.

Furthermore, when the heat resistance is particularly critical, it is preferable to employ silicon based resins which satisfy the following Conditional Expressions (16) and (17):

Expression (16) (Number of silicon atoms comprised as $(R1SiO_{3/2}) \times 100$/(number of total silicon atoms comprised in said silicon based resin)$\leq 5\%$ Expression (17) (Number of silicon atoms comprised-as $(SiO_{4/2}) \times 100$/(number of total silicon atoms comprised in said silicon based resin)$\geq 10\%$ Further, in Expression (16), the content of the trifunctional siloxane units is more preferably 0 percent.

In order to obtain the heat resistance, silicon based resins, which satisfy the following Conditional Expression (18), are more preferred:

Expression (18) $10\% \leq$(Number of silicon atoms comprised as $(SiO_{4/2}) \times 100$/(number of total silicon atoms comprised in said silicon based resin)$\leq 90\%$ Further, by allowing said resins to be in the above range, it is possible to obtain higher hardness as well as impact resistance. In addition, in order to obtain further higher impact resistance, it is preferable to satisfy the following Conditional Expression (19):

Expression (19) $15\% \leq$(Number of silicon atoms comprised as $(SiO_{4/2}) \times 100$/(number of total silicon atoms comprised in said silicon based resin)$\leq 85\%$ Compared to Expression (20), it is more preferable to the following Conditional Expression (20):

Expression (19) $30\% \leq$(Number of silicon atoms comprised as $(SiO_{4/2}) \times 100$/(number of total silicon atoms comprised in said silicon based resin)$\leq 70\%$ Further, silicon based resins are preferably silicone resins.

Optical lenses comprising silicon based resins, as described in the present invention, mean those comprising silicon based resins. Molded optical lenses preferably comprise at least 70 percent by weight of said silicon based resins, and more preferably comprise at least 80 percent by weight of the same. Further, the present invention includes those mixed with other resins as well as various additives in an amount which does not adversely affect the effects of the present invention. Furthermore, for various purposes, the surface of lenses may be provided with a variety of coating layers.

R1, which bonds to silicon atoms comprised of trifunctional siloxane units, and R2 and R3, which bond to silicon atoms comprised of bifunctional siloxane units, each independently represent a hydrogen atom, a hydroxyl group, an amino group, a halogen atom, or an organic group.

Further, unifunctional siloxane units $(R4R5R6Si_{1/2})$ may be incorporated into silicon based resins, wherein R4, R5, and R6 are the same or different, and each independently represents a hydrogen atom, a hydroxyl group, an amino group, a halogen atom, or an organic group.

R1 as a trifunctional siloxane unit, $R1SiO_{3/2}$, represents a hydrogen atom, a hydroxyl group, an amino group, a halogen atom, or an organic group.

Organic groups may be the same type or different, and may include a substituted or unsubstituted alkyl, alkenyl, alkylene, aryl, cycloalkyl group, and the like.

Alkyl groups include a methyl group, an ethyl group, a propyl group, a butyl group, a benzyl group, a phenetyl group, a trifluoromethyl group.

Alkenyl groups include an allyl group, a vinyl group, an isopropenyl group, a butenyl group, and the like. Said alkenyl group is preferably a vinyl group.

Alkylene groups include a methylene group, an ethylene group, a propylene group, a butylene group, and the like.

Aryl groups include a phenyl group, a tolyl group, a xylyl group, a naphthyl group, a chlorophenyl group, a tribromophenyl group, a pentafluorophenyl group, a furyl group, a thienyl group, a pyridyl group, and the like.

Cycloalkyl groups include a cyclopentyl group, a cyclohexyl group, an adamantyl group, a norbornyl group, and the like.

When the number of silicon atoms comprises as a trifunctional siloxane unit, $R1SiO_{3/2}$ and the number of silicon atoms comprised as a tetrafunctional siloxane unit, $SiO_{4/2}$, are independently varied, the following effects are obtained. By increasing the number of silicon atoms comprised as a trifunctional siloxane unit, it is possible to further enhance the impact resistance. By increasing the number of silicon atoms of the tetrafunctional siloxane unit, it is possible to further improve the heat resistance. Thus it is possible to vary the composition ratio according to requirements.

Both of the number of silicon atoms of the trifunctional unit and the number of the tetrafunctional siloxane unit are preferably at least 5 percent.

Furthermore, in order to obtain optical elements with a higher hardness, the ratio of the number of silicon atoms incorporated into trifunctional siloxane units to that of the total silicon atoms incorporated into the silicon based resin is preferably between 10 and 90 percent.

It is possible for an optical element comprising the silicon based resin of the present invention to exhibit higher light transmittance in a wide wavelength region. By employing an alkyl group or a hydrogen atom in an amount of at least 20 mol percent as the substituent bonded to silicon atoms, it is possible to obtain at least 80 percent of the spectral transmittance in the wide wavelength region of 250 to 900 nm. Specifically, it is possible to enhance the light transmittance in the short region.

In the present invention, by employing an aromatic group in an amount of 15 to 100 mol percent as the substituent bonded to the silicon atom, it is possible to further enhance the refractive index. As aromatic groups, aryl groups are preferred, and a phenyl group, a tolyl group, a monochlorophenyl group and the like are more preferred.

Specific examples of trifunctional siloxane $(R1SiO_{3/2})$ are illustrated below. However, the present invention is not limited to these examples.

The following compounds and the like may be listed.

S3-1 $(CH_3)SiO_{3/2}$
S3-2 $(CH_2=CH)SiO_{3/2}$
S3-3 $(C_6H_5)SiO_{3/2}$
S3-4 $(C_6H_1)SiO_{3/2}$
S3-5 $(C_{10}H_7)CH_2CH_2SiO_{3/2}$
S3-6 $(C_6H_2Br_3CH_2CH_2)SiO_{3/2}$
S3-7 $(C_6H_5CH_2)SiO_{3/2}$
S3-8 $—(CH_2CH_2)SiO_{3/2}$

In addition to trifunctional and tetrafunctional siloxane units, unifunctional units and bifunctional units, and structural units other than siloxane structural units may be included.

The unifunctional siloxane unit is a siloxane unit comprising three substituents, and the following compounds are listed as specific examples.

$(CH_3)_3SiO_{1/2}$, $(CH_3)_2(CH2=CH—)SiO_{1/2}$, $(C_6H_5)(CH_3)_2SiO_{1/2}$, $(C_6H_5)_3SiO_{1/2}$, $(C_6H_{11})(CH_3)_2SiO_{1/2}$, $(C_6H_5CH_2)(CH_3)_2SiO_{1/2}$, $—(CH_2CH_2)(CH_3)_2SiO_{1/2}$

The bifunctional siloxane unit is a siloxane unit having two substituents, and the following compounds are listed as specific examples.

$(CH_3)_2SiO_{2/2}$, $(CH_3)(CH_2=CH)SiO_{2/2}$, $(C_6H_5)(CH_3)SiO_{2/2}$ $(C_6H_5)_2SiO_{2/2}$, $(C_5H_{11})(CH_3)SiO_{2/2}$, $(C_{10}H_7CH_2CH_2)(CH_3)SiO_{2/2}$, $(C_6H_5CH_2)(CH_3)SiO_{2/2}$, $(C_6H_2Br_3CH_3CH_2)(CH_3)SiO_{2/2}$, $—(CH_2CH_2)(CH_3)$, $—(CH_2CH_2)_2SiO_{2/2}$

The content ratio of the bifunctional siloxane units is preferably no more than 60 percent in order to decrease the hardness necessary for optical elements. In order to enhance the mechanical strength, the content ratio is preferably at least 5 percent.

The siloxane structural unit as described herein means a structural unit comprising silicon atoms other than the siloxane unit, and specifically means a structural unit having a bond other than a siloxane bond found in silazane, polysilane, silphenylene, silalkylene, and the like.

The content ratio of each siloxane unit is accurately obtained by measuring solid high resolution $^{29}$Si-NMR spectra ($^{29}$Si-MAS) of an optical element after molding.

Specific examples of chemical shift values at which a peak is detected which corresponds to each structural unit in the solid high-resolution $^{29}$Si-NMR spectra.

| | |
|---|---:|
| $(CH_3)_3SiO_{1/2}$ | 6 to 8 ppm |
| $(CH_3)_2SiO_{2/2}$ | −17.8 to −23.0 ppm |
| $(CH_3)SiO_{3/2}$ | −65 to −66 ppm |
| $(C_6H_5)SiO_{3/2}$ | −78 ppm |
| $SiO_{4/2}$ | −105 to −106 ppm |

The quantitative value (in mol percent) of each structural unit can be accurately obtained by measuring the area percentage of each peak in the solid high-resolution $^{29}$Si-NMR spectra ($^{29}$Si-MAS).

Optical elements comprising the silicon based resin of the present invention are preferably prepared by employing a method in which one type or a plurality of types of organopolysiloxanes, hardeners, and catalysts are placed in a molding die and are cured.

Listed as curing reactions can be room temperature curing reaction, ultraviolet ray curing reaction, electron-beam curing reaction, and thermal curing reaction. Of these, the curing reaction is preferred from the view of productivity.

Listed as curing reactions are dehydration condensation, alcohol-eliminating condensation, dehydrogenation condensation, peroxide crosslinking, and addition polymerization. The addition polymerization is preferred because the light transmittance of the optical element is not degraded. Preferably employed, as the catalysts of the addition polymerization are platinum compounds.

Organopolysiloxanes may be synthesized employing a method which is conventionally well known. For example, those are obtained by co-hydrolyzing hydrolyzable silanes corresponding to each siloxane unit such as chlorosilane, alkoxysilane, and the like.

When molding is carried out employing the addition polymerization reaction utilizing a platinum catalyst, it is preferable that the molding is carried out at 100 to 200° C. for about 10 minutes to about 3 hours, employing one type or a plurality of types of organopolysiloxane components having a weight average molecular weight of 300 to 100,000 as well as having an alkenyl group such as a vinyl group, an allyl group, and the like at the terminal or side chain together with one type or a plurality of types of organohydrogenpolysiloxanes having a weight average molecular weight of 300 to 100,000 as the curing agent. The amount of platinum catalysts is preferably between 0.1 and 1,000 ppm.

In addition to organohydrogenpolysiloxanes, employed as curing agents can be organic silicone compounds represented by the following general formula.

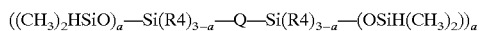

$((CH_3)_2HSiO)_a\text{—}Si(R4)_{3-a}\text{—}Q\text{—}Si(R4)_{3-a}\text{—}(OSiH(CH_3)_2))_a$ wherein R4 represents an organic group, Q represents a divalent aromatic hydrocarbon group, and a is an integer of 1 to 3. The specific examples are shown below.

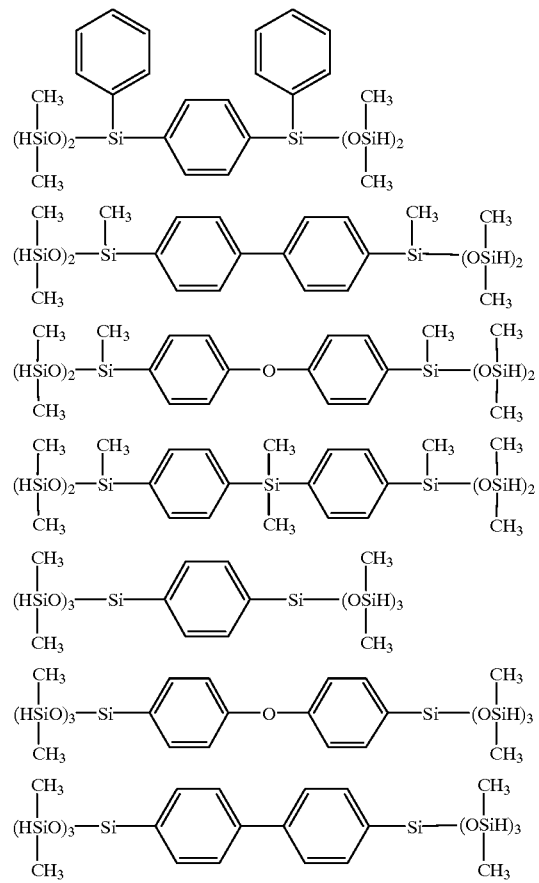

Further, organic silicon compounds shown by the following general formula may be employed:

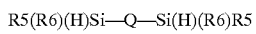

$R5(R6)(H)Si\text{—}Q\text{—}Si(H)(R6)R5$ wherein R5 and R6 each independently represents a univalent hydrocarbon, Q represents a divalent organic group comprising an aromatic hydrocarbon. Specific examples are illustrated below.

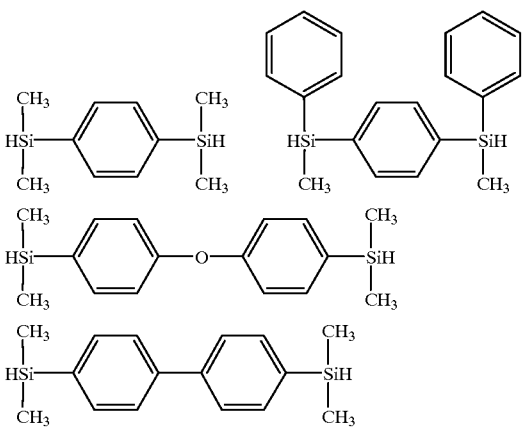

-continued

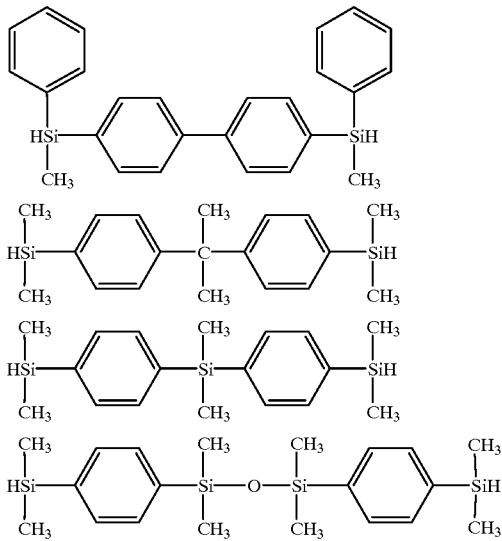

Organopolysiloxanes, having a vinyl group, an allyl group, and the like at the terminal and the side chain, which are employed in the present invention can be synthesized in such a manner that chlorosilane compounds such as chlorosilane, methyltrichlorosilane, dimethyldichlorosilane, phenyltrichlorosilane, diphenyldichlorosilaine, and the like, which are variously combined in the art, are variously combined with chlorosilane compounds having a vinyl group and an allyl group in the molecule which are known in the art, and the resulting combinations undergo co-hydrolysis or alkoxylation followed by condensation.

Depending on the types of combined chlorosilane compounds, the combination ratio, and the reaction conditions, it is possible to regulate the branching and net structure of organopolysiloxanes, the types of reactive group, the amount, the molecular weight and the viscosity, and the like. As a result, it is possible to prepare various types of organopolysiloxanes.

Various types of chlorosilane compounds are marketed by Dow Corning Corporation (in the U.S.A.), Shin-Etsu Kagaku Kogyo Co., Ltd. and the like. For instance, the following chlorosilane compounds are described in the Silicon Compound Agent Catalogue of Shin-Etsu Kagaku Kogyo Co., Ltd.

Tetrachlorosilane (trade name, LS-10), trichlorosilane (trade name, LS-20), methyltricholorsilane (trade name, LS-40), vinyltrichlorosilane (trade name, LS-70), dimethyldichlorosilane (trade name, LS-30), methylvinyldichlorosilane (trade name, LS-190), trimethylchlorosilane (trade name, LS-260), divinyldichlorosilane (trade name, LS-335), dimethylvinylchlorosilane (trade name, LS-380), allyldimethylchlorosilane (trade name, LS-650), 4-chlorophenyltrichlorosilane (trade name, LS-915), phenyltrichlorosilane (trade name, LS-920), cyclohexyltrichlorosilane (trade name, LS-970), benzyltrichlorosilane(trade name, LS-1465), p-tolyltrichlorosilane (trade name, LS-1480), methylphenyldichlorosilane (trade name, LS-1480), phenylvinyldichlorosilane (trade name, LS-1980), dimethylpenylchlorosilane (trade name, LS-2000), octyltrichlorosilane (trade name, LS-2190), methylphenylvinylchlorosilane (trade name, LS-2520), triphenylchlorosilane (trade name, LS-6370), and tribenzylchlorosilane (trade name, LS-6800).

As organopolysiloxanes having a vinyl group and an allyl group at the terminal position or at the side chain, those represented by the following general formula are exemplified.

Specifically preferred examples are illustrated below when obtaining silicon based resins which satisfy Conditional Expressions (7), (8), and (9).

In the following expressions, Vi represents a vinyl group, Me represents a methyl group, Ch represents a cyclohexyl group, Ph represents a phenyl group, Benzy represents a benzyl group, Toly represents a tolyl group, and ClPh represents a monochlorophenyl group.

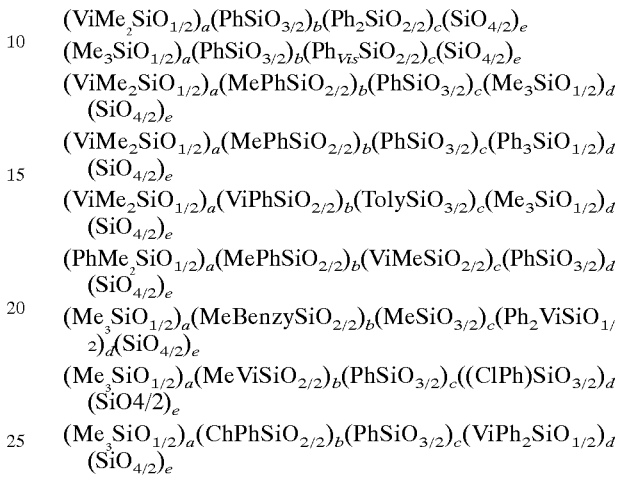

wherein a through e each independently is a positive figure of below 1, and the sum of a through e in each expression is 1.0.

These organopolysiloxanes are obtained employing a method well known in the art, in which organohalosilane corresponding to each compositional unit in the expressions above undergoes co-hydrolysis.

Particularly preferred specific examples are shown below when obtaining silicon based resins satisfying Conditional Expressions (4), (5), and (6).

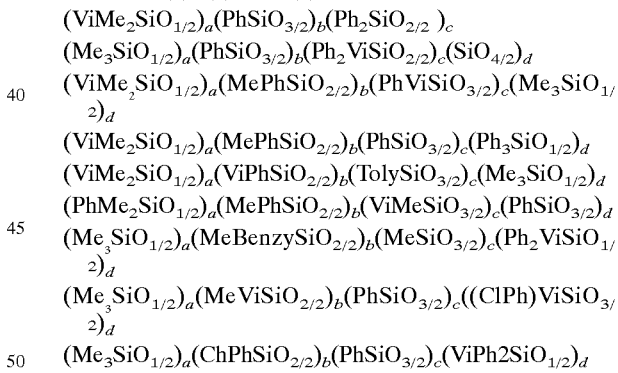

wherein a through d each independently is a positive figure of below 1, and the sum of a through d in each expression is 1.0.

These organopolysiloxanes are obtained employing a method well known in the art, in which organohalosilane corresponding to each compositional unit in the expressions above undergoes co-hydrolysis.

In the same manner as organopolysiloxanes having a vinyl group and an allyl group at the terminal and the side chain, organohydrogenpolysiloxanes may also be synthesized employing various types of chlorosilane compounds having hydrogen atoms bonded to silicon atoms.

For instance, are listed methylhydrogenpolysiloxane having non-reactive trimethylsiloxy groups at both terminals positions, dimethylsiloxane having non-reactive trimethylsiloxy groups at both terminals-methylhydrogenpolysiloxane copolymers, dimethylsiloxane having non-reactive trimethylsiloxy groups at both terminal positions, methylhydrogenpolysiloxane having non-reactive trimethylsiloxy groups at both terminal positions-diphenylsiloxane copolymers, copolymers comprised of $(CH_3)_2HSiO_{1/2}$ units and $SiO_{3/2}$ units, copolymers comprised of $(CH_3)_3SiO_{1/2}$ units, $(CH_3)_2HSiO_{1/2}$ units, and $SiO_{3/2}$ units, copolymers comprised of $(CH_3)_2SiHO_{1/2}$ units, $(C_6H_5)_3SiO_{1/2}$, units, and $SiO_{3/2}$ units, and the like.

Preferred specific examples are illustrated below, when particularly satisfying Conditional Expressions (16) and (17).

$(ViMe_2SiO_{1/2})_a(SiO_{4/2})_b(Ph_2SiO_{2/2})_c$ $(Me_3SiO_{1/2})_a(SiO_{4/2})_b(PhViSiO_{2/2})_c$ $(ViMe_2SiO_{1/2})_a(MePhSiO_{2/2})_b(SiO_{4/2})_{c(Me3}SiO_{1/2})_d$ $(ViMe_2SiO_{1/2})_a(MePhSiO_{2/2})_b(SiO_{4/2})_c(Ph_3SiO_{1/2})_d$ $(ViMe_2SiO_{1/2})_a(ViPhSiO_{2/2})_b(SiO_{4/2})_{c(Me3}SiO_{1/2})_d$ wherein a through d each independently is a positive figure of below 1, and the sum of a through d in each expression is 1.0.

These organopolysiloxanes are obtained employing a method well known in the art, in which organohalosilane corresponding to each compositional unit in the expressions above undergoes co-hydrolysis.

In the same manner as organopolysiloxanes having a vinyl group and an allyl group at the terminal position and at the side chain, organohydrogenpolysiloxanes may also be synthesized employing various types of chlorosilane compounds having hydrogen atoms bonded to silicon atoms.

For instance, are listed methylhydrogenpolysiloxane having non-reactive trimethylsiloxy groups at both terminal positions, dimethylsiloxane having non-reactive trimethylsiloxy groups at both terminal positions-methylhydrogenpolysiloxane copolymers, dimethylsiloxane having non-reactive trimethylsiloxy groups at both terminal positions, methylhydrogenpolysiloxane having non-reactive trimethylsiloxy groups at both terminal positions-diphenylsiloxane copolymers, copolymers comprised of $(CH_3)_2HSiO_{1/2}$ units and $SiO_{3/2}$ units, copolymers comprised of $(CH_3)_3SiO_{1/2}$ units and $SiO_{4/2}$ units, copolymers comprised of $(CH_3)_2SiHO_1$ units, $(C_6H_5)_3SiO_{1/2}$ units, and $SiO_{4/2}$ units, copolymers comprised of $(CH_3)_3SiO_{1/2}$ units, $(CH_3)_2HSiO_{1/2}$ units, and $SiO_{4/2}$, copolymers comprised of $(CH_3)_2SiHO_{1/2}$ units, $(C_6H_5)_3SiO_{1/2}$ units, and $SiO_{4/2}$ units, and the like.

Many of the aforementioned organopolysiloxanes having a vinyl group and an allyl group at the terminal position and at the side chain, as well as organohydrogenpolysiloxanes are marketed by silicone material manufacturers such as Toshiba Silicone Co., Ltd, Shin-Etsu Kagaku Kogyo Co., Ltd., Toray Dow Corning Silicone Co., Ltd., Dow Corning Corporation (in the U.S.) and the like, and are easily available on the market.

Organohydrogenpolysiloxane components and organopolysiloxanes components having a vinyl group and an allyl group at the terminal position and at the side chain, which are employed to prepare optical elements, are preferably well compatible in order to increase the light transmittance of the resulting optical elements.

The blending amount of organohydrogenpolysiloxanes is preferably between 5 and 30 weight parts per 100 weight parts of the organopolysiloxane component having a vinyl group and an allyl group at the terminal position and at the side chain. In order to sufficiently increase the hardness of the resulting optical element, the blending amount of the organohydrogenpolysiloxanes is preferably at least 5 weight parts, and in order to enhance the light transmittance, the blending amount of the organohydrogenpolysiloxanes is preferably increased.

When addition polymerization reaction is employed for curing reaction, platinum catalysts are preferably employed as the reaction catalyst. For example, are listed platinum black, platinic chloride, chloroplatinic acid, alcohol-modified compounds of chloroplatinic acid and the like, complexes of chloroplatinic acid with olefins, and the like. The added amount of catalysts is preferably between 0.1 and 1,000 ppm with respect to the total amount of components, and is more preferably between 5 and 200 ppm.

Organopolysiloxanes forming the silicon based resins employing in the present invention are preferably comprised of compositions containing organopolysiloxanes represented by an average compositional expression $R2_a(C_nH_{2n+1})_bSiO_{(4-a-b)}$ (wherein R2 represents a hydrogen atom, a hydroxyl group, an amino group, a halogen atom or an organic group other than alkyl groups, a>0, b>0, 0<a+b<2, and n represents a positive integer), and a compound having n=1, e.g., a methyl group, is particularly preferred, because the resulting optical elements is capable of exhibiting high light transmittance in a wide region. Further, a and b are preferably in the range of 0<a<1.0 and 5<b<2, respectively.

Furthermore, organopolysiloxanes forming the silicon based resins employing in the present invention are preferably comprised of compositions containing organopolysiloxanes represented by an average compositional expression $R2_c(H)_dSiO_{(4-c-d)}$, (wherein R3 represents a hydroxyl group, an amino group, a halogen atom or an organic group, c>0, d>0, 0<c+d<2), because the resulting optical elements are capable of exhibiting high light transmittance in a wide region. Further, c and d are preferably in the range of 0<c<1.0 and 5<d<2, respectively.

The most preferred embodiment is that the silicon based resins employed in the present invention is silicone resins formed by employing the aforementioned organopolysiloxanes, and the aforementioned optical element is comprised of said silicone resins.

In addition to the organohydrogenpolysiloxane component, the organopolysiloxane component having a vinyl group and an allyl group at the terminal position and at the side chain, and catalysts, reinforcing fillers such as fumed silica and the like may be employed for the purpose of increasing the mechanical strength of the optical element in the range of an amount which does not decrease the light transmittance of said optical element. Further, for the purpose of regulating the hardness as well as the viscoelasticity of molded elements, chained organopolysiloxanes having an average molecular weight of 3,000 to 10,000 may be employed as a third polymer component.

The optical elements comprised of curable silicone resins, which are preferably employed in the present invention may be molded employing molding methods such as injection molding, extrusion molding, pouring type molding, and the like.

By applying the silicon based resin of the present invention to optical lenses in which the optical surface is aspheric, optical lenses are obtained which have properties according to the present invention, further have excellent transferability of a molding die, and exhibit excellent wave surface aberration of an aspheric lens. In the aspheric lens, at least one of the optical surfaces is preferably aspheric, and both are more preferably aspheric.

In the optical element comprising the silicon based resins of the present invention, it is possible to obtain optical element having higher mechanical strength such as as of a JIS-A Hardness of at least 85.

Further, the optical element comprising the silicon based resins of the present invention may be provided with an antireflection layer in order to enhance the light transmittance. Still further, a hard coat layer may be provided in order to minimize the abrasion of base materials and the surface.

As described above, in order to further enhance the light transmittance, it is possible to provide an antireflection layer onto the surface of an optical element. The antireflection layer may be composed of a single layer or a multilayer obtained by laminating thin layers having different refractive indexes. It is possible to use inorganic or organic materials which are capable of decreasing reflectance.

However, in order to effectively enhance the surface hardness as well as to effectively minimize interference fringes, it is most preferable to provide a single layer comprised of inorganic materials, or an antireflection layer comprised as a multilayer. Listed as employable inorganic materials are oxides or fluorides such as silicon oxide, aluminum oxide, zirconium oxide, titanium oxide, cerium oxide, hafnium oxide, and magnesium fluoride.

The layer is provided employing a so-called PVD method such as ion plating, vacuum evaporation, sputtering, and the like.

The optical element of the present invention is prepared employing silicon based resins as the main component. As a result, said optical element exhibits advantages in which a primer layer is not required, which is commonly employed to enhance the adhesion of a hard coat layer with the component when employing a silicone hard coat agent.

Preferred examples of said hard coat layer include those prepared in such a manner that the coating compositions comprised of the following (1) and (2) as the main components are coated and cured.

(1) At least one of silane compounds having at least one of reactive groups
(2) Fine particles of metal oxides such as silicon oxide, antimony oxide, zirconium oxide, tungsten oxide, tantalum oxide, aluminum oxide and the like, and fine particles of composite metal oxides obtained by employing at least two of titanium oxide, cerium oxide, zirconium oxide, silicon oxide, and iron oxide, and at least one type of fine composite metal particles prepared by coating fine tin oxide particles with fine composite metal particles of fine tin oxide particles and tungsten oxide.

Said component (2) is an effective component to regulate the refractive index of the hard coat layer as well as to enhance its hardness. The preferred thickness of said hard coat layer is generally between about 0.2 and about 10 microns, and the more preferred thickness is between about 1 and 3 microns.

Further, when the optical element of the present invention is employed, the embodiment of an optical pickup device will be described below, which is employed in a particularly preferred optical information recording medium reading and reproducing apparatus.

Said optical pickup device comprises a light source, which emits a light flux, a light condensing system having an objective lens which condenses the emitted light flux and condenses it onto an information recording surface of the information recording medium, and an optical detector which receives the light reflected from the information recoding surface or transmitted through the information recording surface followed by detecting signals. When the optical element of the present information is applied to a pickup unit which comprises a light source emitting a light flux having a wavelength of no more than 600 nm (preferably no more than 500 nm, and more preferably no more than 400 nm), the effects (light transmittance and ultraviolet resistance) of the optical element of the present invention preferably exhibits remarkable effects of the optical element of the present invention. Furthermore, when said optical pickup device is employed for recoding information of a light information recording medium, the use of the optical element of the present invention preferably enhances the effects of the optical element of the present invention.

First Embodiment

The present invention will be detailed with reference to the examples and comparative examples below.

In the following description, Vi represents a vinyl group, Me represents a methyl group, Ch represents a cyclohexyl group, Ph represents a phenyl group, Benzy represents a benzyl group, Toly represents a tolyl group, and ClPh represents a monochlorophenyl group.

In the following, shown are Organopolysiloxane Components 1 through 8, having a vinyl group and an allyl group at the terminal position or at the side chain, and Organohydrogenpolysiloxane Components 1 through 3, which were employed in these experiments.

These organopolysiloxanes were synthesized employing a synthesis method known in the art, that is, co-hydrolysis of a plurality of hydrolyzable silane compounds.

The specific synthesis method of Organosiloxane 1 will be briefly described below.

$Vi(CH_3)SiCl$, $(C_6H_5)SiCl_3$, $(CH_3)_3SiCl$, $(C_6H_5)(Yoly)SiCl_2$, and $SiCl_4$ were mixed. Water was then added to he resulting mixture followed by co-hydrolysis. The reaction products were well washed with water and were concentrated under reduced pressure to obtain organopolysiloxane.

Organopolysiloxanes 2 through 8 were synthesized by varying combinations with other chlorosilane compounds.

After the synthesis, Si was quantitatively analyzed employing a $^{29}Si$-NMR method, a $^1H$-NMR method, and an ICP method, and the average composition was obtained employing an organic element analytical method.

The average composition was described employing the average compositional expression, $R_xSiO_{(4-x)/2}$.

Organopolysiloxane 1
$Vi_{0.05}Ph_{1.04}Toly_{0.22}Me_{0.25}SiO_{1.23}$
Organopolysiloxane 2
$Vi_{0.10}Ph_{1.26}Me_{0.06}Ch_{0.10}SiO_{1.24}$
Organopolysiloxane 3
$Vi_{0.10}(ClPh)_{0.15}Ph_{0.87}Me_{0.50}SiO_{1.19}$
Organopolysiloxane 4
$Vi_{0.08}(Benzy)_{0.40}Ph_{0.60}Me_{0.48}SiO_{1.22}$
Organopolysiloxane 5
$Vi_{0.01}Me_{1.97}SiO_{1.01}$
Organopolysiloxane 6
$Ph_{1.93}Vi_{0.01}SiO_{1.03}$
Organopolysiloxane 7
$Vi_{0.04}Me_{0.08}Ph_{1.36}SiO_{1.26}$
Organopolysiloxane 8
$Vi_{0.08}Me_{1.50}SiO_{1.21}$
Organohydrogenpolysiloxane 1
Methylhydrogenpolysiloxane having non-reactive trimethylsiloxy groups at both terminals
Organohydrogenpolysiloxane 2
Copolymer comprised of $(CH_3)_2HSi_{2/1}$ units and $SiO_{3/2}$ units (copolymerization ratio of 8/2)
Organohydrogenpolysiloxane 3
$H_{1.00}Me_{0.42}SiO_{1.29}$ Organic Silicon Compound-1

$H(CH_3)_2SiOSi(OSi((CH_3)_2H))(C_6H_5)C_6H_4Si(C_6H_5)OSi(OSi((CH_3)_2H))(CH_3)_2H$

EXAMPLE 1-1

One hundred weight parts of Organopolysiloxane 1, 5 weight parts of Organopolysiloxane 6, 10 weight parts of Organohydrogenpolysiloxane 2, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 145° C. for 10 minutes. Thus a molded lens having an aspheric surface on one side was obtained by injection molding. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 1-2

One hundred weight parts of Organopolysiloxane 2, 5 weight parts of Organopolysiloxane 6, 10 weight parts of Organohydrogenpolysiloxane 2, and one weight part of a chloroplatinic acid isopropanol solution (having a platinum content of 0.2 percent by weight) were employed, and a molded lens, having an aspheric surface on one side, was obtained in the same manner as Example 1. Further, a flat molded plate (having a diameter of 8 cm, and a thickness of 1.8 mm) was prepared for evaluation of its physical properties. The light transmittance of the flat molded plate was measured in the region of 400 to 850 =m, and the obtained light transmittance was at least 85 percent.

EXAMPLE 1-3

One hundred weight parts of Organopolysiloxane 3, 80 weight parts of Organopolysiloxane 2, 20 weight parts of Organohydrogenpolysiloxane 1, and 1.1 weight parts of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 150° C. for 15 minutes. Thus a molded lens having an aspheric surface on one side was obtained by injection molding. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 1-4

One hundred weight parts of Organopolysiloxane 4, 80 weight parts of Organopolysiloxane 2, 15 weight parts of Organohydrogenpolysiloxane 1, 5 weight parts of Organic Silicon Compound-1, and 1.1 weight parts of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 150° C. for 15 minutes. Thus a molded lens having an aspheric surface on one side was obtained by injection molding. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 1-5

One hundred weight parts of Organopolysiloxane 7, 10 weight parts of Organopolysiloxane 5, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die under 40 atmospheric pressure and heated at 145° C. for 10 minutes. Thus a molded lens having an aspheric surface on both sides was obtained by injection molding. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 1-6

One hundred weight parts of Organopolysiloxane 8, 80 weight parts of Organopolysiloxane 2, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 145° C. for 10 minutes. Thus a molded lens having an aspheric surface on both sides was obtained by injection molding. Further, a flat molded plate (having a diameter of 8 cm, and a thickness of 1.8 mm) was prepared for evaluation of its physical properties. The spectral transmittance of the flat molded plate was measured in the region of 400 to 850 nm, and the obtained light transmittance was at least 80 percent. Furthermore, the light transmittance in the region of 250 to 900 nm was measured, and the obtained light transmittance was at least 80 percent.

EXAMPLE 1-7

One hundred weight parts of Hydrogenpolysiloxane 3, 20 weight parts of Organopolysiloxane 8 and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 145° C. for 10 minutes. Thus a molded lens having an aspheric surface on both sides was obtained by injection molding. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained transmittance was at least 80 percent. Furthermore, the light transmittance in the region of 250 to 900 nm was measured, and the obtained light transmittance was at least 80 percent.

COMPARATIVE EXAMPLE 1-1

Fifteen parts of Organopolysiloxane 1, 100 weight parts of Organopolysiloxane 5, 20 weight parts of Organohydrogenpolysiloxane 1, and one weight part of a chloroplatinic acid isopropanol solution (having a platinum content of 0.2 percent by weight) were employed, and a molded lens having an aspheric surface on one side was obtained in the same manner as Example 1. Further, a flat molded plate (having a diameter of 8 cm, and a thickness of 1.8 mm) was prepared for evaluation of its physical properties. The light transmittance of the flat molded plate was measured at a wavelength of 250 nm, and the obtained transmittance was no more than 60 percent.

COMPARATIVE EXAMPLE 1-2

One hundred parts of Organopolysiloxane 6, 10 weight parts of Organopolysiloxane 1, 15 weight parts of Organohydrogenpolysiloxane 1, and one weight part of a chloroplatinic acid isopropanol solution (having a platinum content of 0.2 percent by weight) were employed, and a molded lens having an aspheric surface on one side was obtained in the same manner as Example 1. Further, a flat molded plate (having a diameter of 8 cm, and a thickness of 1.8 mm) was prepared for evaluation of its physical properties. The light transmittance of the flat molded plate was measured at a wavelength of 250 nm, and the obtained light transmittance was no more than 5 percent.

COMPARATIVE EXAMPLE 1-3

A molded lens having an aspheric surface on one side was obtained by molding commercially available Acrypet VH (manufactured by Mitsubishi Rayon) comprised of a polymethyl methacrylate resin for plastic lenses employing a lens molding die according to an injection molding method. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 1-4

A molded lens having an aspheric surface on one side was obtained by molding commercially available Ubiron S2000 (having an average molecular weight of 24,000, manufactured by Mitsubishi Gas Kagaku) comprised of a bisphenols A-type polycarbonate resin for plastic lenses employing a lens molding die according to an injection molding method. Further, a flat molded plate (having a diameter of 8 cm, and a thickness of 1.8 mm) was prepared for evaluation of its physical properties. The light transmittance of the flat molded plate was measured at a wavelength of 250 nm, and the obtained light transmittance was no more than 5 percent.

Further, the content ratio (in percent) of trifunctional and tetrafunctional units, and various physical properties composed for molded lenses were measured employing the methods described below, and were then evaluated. Measurement of the content ratio (in percent) of trifunctional and tetrafunctional units in molded lenses:

After a molded product was frozen in liquid nitrogen, the resulting product was shattered, and then its $^{29}$Si-NMR spectra were measured employing a solid high resolution FT-NMR apparatus (EX270, manufactured by Nippon Denshi Co.). In order to accurately measure the mol percent of basic compositional unit, $^{29}$Si-MAS with higher quantitative accuracy was used in the measurement method. The measurement conditions are shown below:

| Apparatus | JEOL 270EXWB |
|---|---|
| Measurement nucleus | $\mu^{29}$Si |
| Observed frequency | 53.54 MHZ |
| Measurement range | 10,000 Hz |
| Data point | data point 8192, sampling point 2048 |
| Measurement method | $^{29}$Si-MAS |
| Pulse width | 4.2 $\mu$second ($^{29}$Si 90 degrees pulse) |
| Integration repetition | pd = 20 seconds |
| Integration frequency | 6,400 |
| Rotational frequency of sample | 5 kHz |
| Measurement temperature | room temperature |

Tetramethyl silane was used as the standard for the chemical shift.

Refractive index: Refractive index of the molded product was measured employing an Abbe refractometer (trade name 2T, manufactured by Atago Co.).

Double refraction: Phase difference (in nm) was measured employing an automatic double refractometer.

Light transmittance: Light transmittance, in the region of 400 to 850 nm, was measured employing a visible infrared spectrophotometer (Hitachi Automatic Recording Spectrophotometer). Light transmittance in the region of 250 to 900 nm was measured employing an infrared visible near infrared spectrophotometer (Nihon Bunko V570).

Heat resistance: After placing a molded product for 2 hours in a dryer at 150° C., the resulting product was observed visually as well as employing a "Film Orientation Viewer" (trade name marketed by Konica Research Lab Co.).

Then, products which did not suffer any change such as deformation, cracking, surface degradation, coloration, and the like, were graded as ○, those which suffered any change were graded as X.

Hardness: in accordance with the JIS 7215, JIS-A Hardness was measured employing a durometer. Those exhibiting at least 85 were graded as ○. Those exhibiting no more than 85 were graded as X, because such hardness is not sufficient in a plastic lens.

Saturated water absorption: in accordance with JIS 7209 (Method for Water Absorption Ratio of Plastics), the measurement was carried out employing a test piece having a diameter of 8 cm and a thickness of 1.8 mm.

The content ratios (in percent) of trifunctional and tetrafunctional units, refractive index, double refraction, hardness, heat resistance, saturated water absorption ratio of molded plastic products, in Examples 1-1 through 1-7, as well as Comparative Examples 1-1 through 1-4, were measured. Table 1 shows the results.

TABLE 1

| Sample No. | Content Ratio of Tri-functional Silicon Atom (in %) | Content Ratio of Tri-functional Silicon Atom (in %) | Refractive Index | Double Refraction (in nm) | Hardness | Heat Resistance | Saturated Water Absorption Ratio (in %) |
|---|---|---|---|---|---|---|---|
| Example 1-1 | 30 | 17 | 1.51 | 8 | ○ | ○ | <0.1 |
| Example 1-2 | 25 | 28 | 1.50 | 9 | ○ | ○ | <0.1 |
| Example 1-3 | 31 | 8 | 1.52 | 11 | ○ | ○ | <0.1 |
| Example 1-4 | 15 | 29 | 1.53 | 9 | ○ | ○ | <0.1 |
| Example 1-5 | 38 | 8 | 1.52 | 9 | ○ | ○ | <0.1 |
| Example 1-6 | 30 | 9 | 1.41 | 8 | ○ | ○ | <0.1 |
| Example 1-7 | 41 | 10 | 1.36 | 9 | ○ | ○ | <0.1 |
| Comparative Example 1-1 | 3 | 1 | 1.42 | 11 | X | ○ | <0.1 |
| Comparative Example 1-2 | 2 | 1 | 1.53 | 13 | X | ○ | <0.1 |
| Comparative Example 1-3 | — | — | 1.49 | 18 | ○ | X | 2.0 |
| Comparative Example 1-4 | — | — | 1.59 | 65 | ○ | X | 0.3 |

Further, molded lens products in Examples 1-1 through 1-7 were subjected to a light fastness test (at room temperature for 30 days) employing a Xenon Long Life Weather Meter WEL-6X-HC-EC, manufactured by Suga Shikenki Co.). No product suffered from generation of fine cracks nor coloration.

According to the present invention, it is possible to provide an optical lens which exhibits excellent basic optical properties such as refractive index, double refraction, light transmittance, and the like, as well as exhibits high heat resistance, low water absorption, high hardness, and excellent moldability.

Second Embodiment

The present invention will be specifically described with reference to the examples as well as comparative examples below.

In the following description, Vi represents a vinyl group, Me represents a methyl group, Ch represents a cyclohexyl group, Ph represents a phenyl group, Benzy represents a benzyl group, Toly represents a tolyl group, and ClPh represents a monochlorophenyl group.

In the following, are shown organopolysiloxane components 1 through 8, having a vinyl group and an allyl group at the terminal position or at the side chain, and organohydrogenpolysiloxane components 1 through 3, which were employed in these experiments.

These organopolysiloxanes were synthesized employing a synthesis method known in the art, that is, co-hydrolysis of a plurality of hydrolyzable silane compounds. Specific synthesis methods will be described below.
Organosiloxane 1

After mixing $Vi(Me_3)SiCl$, $(Ph)SiCl_3$, $(Me)_3SiCl$, $(Ph)(Yoly)SiCl_2$, and $SiCl_4$, water added to the resulting mixture, followed by co-hydrolysis. The reaction products were well washed with water and were concentrated under reduced pressure to obtain the organopolysiloxane.

Further, organopolysiloxanes 2 through 6 were synthesized by varying combinations of other chlorosilane compounds. After the synthesis, Si was quantitatively analyzed employing a $^{29}$Si-NMR method, a $^1$H-NMR method, and an ICP method, and the average composition was obtained employing an organic element analytical method.

Average compositions were described employing the average compositional expression, $R_xSiO_{(4-x)/2}$.

Organopolysiloxane 1
 $Vi_{0.05}Ph_{1.10}Toly_{0.20}Me_{0.25}SiO_{1.20}$
Organopolysiloxane 2
 $Vi_{0.10}Ph_{1.32}Me_{0.06}Ch_{0.10}SiO_{1.21}$
Organopolysiloxane 3
 $Vi_{0.10}(ClPh)_{0.15}Ph_{0.95}Me_{0.50}SiO_{1.15}$
Organopolysiloxane 4
 $Vi_{0.08}(Benzy)_{0.05}Ph_{0.60}Me_{0.48}SiO_{1.17}$
Organopolysiloxane 5
 $Vi_{0.01}Me_{1.97}SiO_{1.01}$
Organopolysiloxane 6
 $Ph_{i.93}Vi_{0.01}SiO_{1.03}$
Organopolysiloxane 7
 $V_{0.04}Me_{0.10}Ph_{1.38}SiO_{1.24}$
Organopolysiloxane 8
 $Vi_{0.10}Me_{1.50}SiO_{1.20}$
Organohydrogenpolysiloxane 1
 Methylhydrogenpolysiloxane having non-reactive trimethylsiloxy groups at both terminals
Organohydrogenpolysiloxane 2
 Copolymer comprised of $(CH_3)_2HSi_{2/1}$ units and $SiO_{3/2}$ units (copolymerization ratio of 8/2)
Organohydrogenpolysiloxane 3
 $H_{1.00}Me_{0.38}SiO_{1.31}$
Organic Silicon Compound-1
 $H(CH_3)_2SiOSi(OSi((CH_3)_2H))(C_6H_5)C_6H_4Si(C_6H_5)OSi(OSi((CH_3)_2H))(CH_3)_2H$

EXAMPLE 2-1

One hundred weight parts of Organopolysiloxane 1, 5 weight parts of Organopolysiloxane 6, 10 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die for 20 lenses with a diameter of 3 mm under 40 atmospheric pressure and heated at 145° C. for 10 minutes. Thus molded lenses having an aspheric surface on one side were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured over the region of 400 to 850 nm, and the obtained light transmittance was at least 85 percent.

EXAMPLE 2-2

One hundred weight parts of Organopolysiloxane 1, 5 weight parts of Organopolysiloxane 6, 10 weight parts of Organohydrogenpolysiloxane 1, and one weight part of a chloroplatinic acid isopropanol solution (having a platinum content of 0.2 percent by weight) were employed, and molded lenses having an aspheric surface on one side were obtained in the same manner as Example 2-1. Releasing properties from the die were excellent, and all the lenses were within specifications. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-3

One hundred weight parts of Organopolysiloxane 3, 80 weight parts of Organopolysiloxane 2, 20 weight parts of Organohydrogenpolysiloxane 1, and 1.1 weight parts of a chloroplatinic acid isopropanol solution (platinum content of 0.2 percent by weight) were mixed, and the resulting mixture was defoamed employing a vacuum stirrer to prepare a silicone resin composition. The resulting silicone resin composition was injected into a lens molding die for 20 lenses with a diameter of 3 mm and heated at 150° C. for 15 minutes. Thus molded lenses having an aspheric surface on one side were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-4

One hundred weight parts of Organopolysiloxane 4, 80 weight parts of Organopolysiloxane 2, 15 weight parts of Organohydrogenpolysiloxane-1, 5 weight parts of Organic Silicon Compound-1, and 1.1 weight parts of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die for 16 lenses with a diameter of 3 mm under 40 atmospheric pressure and heated at 150° C. for 15 minutes. Thus molded lenses having an aspheric surface on both sides were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-5

One hundred weight parts of Organopolysiloxane 1, 5 weight parts of Organopolysiloxane 6, 10 weight parts of Organohydrogenpolysiloxane 1, 5 weight parts of Organic Silicon Compound-1, and one weight part of a chloroplatinic acid isopropanol solution (having a platinum content of 0.2 percent by weight) were mixed, and the resulting mixture was defoamed employing a vacuum stirrer to prepare a silicone resin composition. Molded lenses having an aspheric surface on both sides were obtained in the same manner as Example 2-4. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-6

Molded lenses having an aspheric surface in one side were obtained in the same manner as Example 2-1 by employing 30 weight parts of Organopolysiloxane 1, 100 weight parts of Organopolysiloxane 5, 20 weight parts of Organohydrogenpolysiloxane 1, and 1.1 weight parts of a chloroplatinic acid isopropanol solution (having a platinum content of 0.2 percent by weight). Releasing properties from the die were excellent, and all the lenses were within specifications. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-7

One hundred weight parts of Organopolysiloxane 7, 10 weight parts of Organopolysiloxane 5, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die for 20 lenses with a diameter of 5 mm at 40 atmospheric pressures and heated at 145° C. for 10 minutes. Thus molded lenses having an aspheric surface on both sides were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 2-8

One hundred weight parts of Organopolysiloxane 8, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die for 20 lenses with a diameter of 3 mm at 40 atmospheric pressures and heated at 145° C. for 10 minutes. Thus molded lenses having an aspheric surface on both sides were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent. The light transmittance of the same was also measure in the region of 250 to 900 nm and the obtained light transmittance was at least 80 percent.

EXAMPLE 2-9

One hundred weight parts of Hydrogenpolysiloxane 3, 20 weight parts of Organopolysiloxane 8, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die for 10 lenses with a diameter of 0.3 mm at 40 atmospheric pressures and heated at 145° C. for 10 minutes. Thus molded lenses having an aspheric surface on both sides were obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent. The light transmittance of the same was also measured in the region of 250 to 900 nm and the obtained light transmittance was at least 80 percent.

COMPARATIVE EXAMPLE 2-1

Molded lenses, having an aspheric surface on one side, were obtained in the same manner as Example 2-1, except that 100 weight parts of Organopolysiloxane 6, 10 weight parts of Organopolysiloxane 1, 15 weight parts of Organohydrogenpolysiloxane 1, and 1.1 weight parts of a chloroplatinic acid isopropanol solution (having a platinum content of 0.2 percent by weight) were employed. Releasing properties were excellent. However, the hardness was somewhat lower and was somewhat insufficient for the optical lens. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 2-2

Molded lenses having an aspheric surface on one side was obtained by molding commercially available Acrypet VH (manufactured by Mitsubishi Rayon) comprised of a polymethyl methacrylate resin for plastic lenses employing a lens molding die for 16 lenses with a diameter of 3mm according to an injection molding method. Releasing properties from the die were not good and 3 defective molded products were formed out of 16 products. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 2-3

Molded lenses having an aspheric surface on both sides were obtained by molding commercially available Ubiron S2000 (having an average molecular weight of 24,000, manufactured by Mitsubishi Gas Kagaku) comprised of a bisphenols A-type polycarbonate resin for plastic lenses employing a lens molding die for 10 lenses with a diameter of 1 mm according to an injection molding method. Releasing properties from the die were not good enough and 10 defective molded products were formed out of 10 products. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

Further, the content ratio (in percent) of bifunctional, trifunctional and tetrafunctional siloxane units, composing molded lenses and various physical properties were measured employing the methods described below, and were then evaluated.

Measurement of the content ratio (in percent) of bifunctional, trifunctional and tetrafunctional units in molded lenses:

After a molded product was frozen in liquid nitrogen, it was shattered, and then its $^{29}$Si-NMR spectra were measured employing a solid high resolution FT-NMR apparatus. In order to accurately measure mol percent of basic compositional unit, $^{29}$Si-MAS with higher quantitative accuracy was used in the measurement method. The measurement conditions are shown below.

| | |
|---|---|
| Apparatus | JEOL 270EXWB |
| Measurement nucleus | $^{29}$Si |
| Observed frequency | 53.54 MHz |
| Measurement range | 10,000 Hz |
| Data point | data point 8192, sampling point 2048 |
| Measurement method | $^{29}$Si-MAS |
| Pulse width | 4.2 μsecond ($^{29}$Si 90 degrees pulse) |
| Integration repetition | pd = 20 seconds |
| Integration frequency | 6,400 |
| Rotational frequency of sample | 5 kHz |
| Measurement temperature | room temperature |

Tetramethyl silane was used as the standard for the chemical shift.

Refractive index: Refractive index of a molded product was measured employing an Abbe refractometer (trade name 2T, manufactured by Atago Co.).

Double refraction: Phase difference (in nm) was measured employing an automatic double refractometer.

Light transmittance: Light transmittance in the region of 400 to 850 nm was measured employing a visible infrared spectrophotometer (Hitachi Automatic Recording Spectrophotometer). Light transmittance in the region of 250 to 900 nm was measured employing an infrared visible near infrared spectrophotometer (Nihon Bunko V570).

Heat resistance: After placing a molded product for 2 hours in a dryer at 150° C., the resulting product was observed visually as well as employing a "Film Orientation Viewer" (trade name, marketed by Konica Research Lab Co.).

Then, products which did not suffer any change such as deformation, crack, surface degradation, coloration, and the like were graded as ◯, those which suffered any change were graded as X.

Hardness: In accordance with JIS 7215, JIS-A Hardness was measured employing a durometer. Those exhibiting at least 85 were graded as ◯. Those exhibiting less than 85 were graded as X, because the hardness was not sufficient as a plastic lens.

Saturated water absorption: In accordance with JIS 7209 (Method for Water Absorption Ratio of Plastics), the measurement was carried out employing a test piece having a diameter of 8 cm and a thickness of 1.8 mm.

The content ratios (in percent) of trifunctional and tetrafunctional units, refractive index, double refraction, hardness, heat resistance, saturated water absorption ratio of molded plastic products in Examples 2-1 through 2-9 and Comparative Examples 2-1 through 2-3 were measured. Table 2 shows the results.

Organopolysiloxanes 2 through 8 were synthesized by varying combinations with other chlorosilane compounds.

After the synthesis, Si was quantitatively analyzed employing a $^{29}$Si-NMR method, a $^{1}$H-NMR method, and an ICP method, and the average composition was obtained employing an organic element analytical method.

TABLE 2

| Sample No. | Content Ratio of Trifunctional Silicon Atom (in %) | Content Ratio of Trifunctional Silicon Atom (in %) | Content Ratio of Tetrafunctional Silicon Atom (in %) | Refractive Index | Double Refraction (in nm) | Hardness | Heat Resistance | Saturated Water Absorption Ratio (in %) |
|---|---|---|---|---|---|---|---|---|
| Example 2-1 | 30 | 49 | 0 | 1.51 | 8 | ○ | ○ | <0.1 |
| Example 2-2 | 26 | 54 | 0 | 1.50 | 9 | ○ | ○ | <0.1 |
| Example 2-3 | 50 | 31 | 0 | 1.52 | 11 | ○ | ○ | <0.1 |
| Example 2-4 | 29 | 45 | 0 | 1.53 | 9 | ○ | ○ | <0.1 |
| Example 2-5 | 28 | 49 | 3 | 1.53 | 9 | ○ | ○ | <0.1 |
| Example 2-6 | 60 | 10 | 0 | 1.42 | 11 | Δ | ○ | <0.1 |
| Example 2-7 | 29 | 46 | 0 | 1.53 | 9 | ○ | ○ | <0.1 |
| Example 2-8 | 50 | 39 | 0 | 1.41 | 8 | ○ | ○ | <0.1 |
| Example 2-9 | 28 | 51 | 0 | 1.36 | 9 | ○ | ○ | <0.1 |
| Comparative Example 2-1 | 94 | 4 | 0 | 1.53 | 13 | X | ○ | <0.1 |
| Comparative Example 2-2 | — | — | — | 1.49 | 18 | ○ | X | 2.0 |
| Comparative Example 2-3 | — | — | — | 1.59 | 65 | ○ | X | 0.3 |

Furthermore, molded lens products in Examples 2-1 through 2-9 were subjected to light fastness test (at room temperature for 30 days) employing a Xenon Long Life Weather Meter (WEL-6X-HC-EC, manufactured by Suga Shikenki Co.). No product suffered from the generation of fine cracks as well as coloration.

According to the present invention, it was possible to provide small-sized optical lenses which exhibit excellent optical properties such as high refractive index, low double refraction, high light transmittance in the short wavelength region, and the like, as well as exhibits high heat resistance, low water absorption, high hardness, and excellent moldability, and further to provide optical lenses which may be molded in the large number in one step and may be manufactured at lower cost.

Third Embodiment

The present invention will further be detailed with reference to the examples and comparative examples below.

In the following description, Vi represents a vinyl group, Me represents a methyl group, Ch represents a cyclohexyl group, Ph represents a phenyl group, Benzy represents a benzyl group, Toly represents a tolyl group, and ClPh represents a monochlorophenyl group.

In the following, are shown organopolysiloxane components 1 through 8, having a vinyl group and an allyl group at the terminal position or in the side chain, and organohydrogenpolysiloxane components 1 through 3, which were employed in these experiments.

These organopolysiloxanes were synthesized employing a synthesis method known in the art, that is, co-hydrolysis of a plurality of hydrolyzable silane compounds.

The specific synthesis method of Organopolysiloxane 1 will be briefly described.

After mixing Vi(Me$_3$)SiCl, (Ph)SiCl$_3$, (Me)$_3$SiCl, (Ph)(Yoly)SiCl$_2$, and SiCl$_4$, water was added to the resulting mixture, followed by co-hydrolysis. The reaction products were well washed with water and were concentrated under reduced pressure to obtain organopolysiloxane.

Average compositions were described employing the average compositional expression, $R_xSiO_{(4-x)/2}$.

Organopolysiloxane 1
  $Vi_{0.05}Ph_{0.90}Toly_{0.20}Me_{0.13}SiO_{1.36}$
Organopolysiloxane 2
  $Vi_{0.10}Ph_{0.72}Me_{0.3}Ch_{0.2}SiO_{1.34}$
Organopolysiloxane 3
  $Vi_{0.10}(ClPh)_{0.24}Ph_{0.70}Me_{0.3}SiO_{1.33}$
Organopolysiloxane 4
  $Vi_{0.10}(Benzy)_{0.2}Ph_{0.8}Me_{0.2}SiO_{1.35}$
Organopolysiloxane 5
  $Vi_{0.01}Me_{1.97}SiO_{1.01}$
Organopolysiloxane 6
  $Ph_{1.93}Vi_{0.01}SiO_{1.03}$
Organopolysiloxane 7
  $Vi_{0.04}Me_{0.08}Ph_{1.16}SiO_{1.36}$
Organopolysiloxane 8
  $Vi_{0.08}Me_{1.30}SiO_{1.31}$
Organohydrogenpolysiloxane 1
  Methylhydrogenpolysiloxane having non-reactive trimethylsiloxy groups at both terminals
Organohydrogenpolysiloxane 2
  Copolymer comprised of $(CH_3)_2HSi_{2/1}$ units and $SiO_{3/2}$ units (copolymerization ratio of 8/2)
Organohydrogenpolysiloxane 3
  $H_{0.8}Me_{0.42}SiO_{1.39}$
Organic Silicon Compound-1
  $H(CH_3)_2SiOSi(OSi((CH_3)_2H))(C_6H_5)C_6H_4Si(C_6H_5)OSi(OSi((CH_3)_2H))(CH_3)_2H$

EXAMPLE 3-1

One hundred weight parts of Organopolysiloxane 1, 5 weight parts of Organopolysiloxane 6, 10 weight parts of Organohydrogenpolysiloxane 1, and one weight part of a chloroplatinic acid isopropanol solution (platinum content of 0.2 percent by weight) were mixed, and the resulting mixture was defoamed employing a vacuum stirrer to prepare a silicone resin composition. The resulting silicone resin composition was injected into a lens molding die for 20 lenses under 40 atmospheric pressure and heated at 145° C. for 10 minutes. Thus a molded lens having an aspheric surface on one side was obtained by injection molding.

Furthermore, a flat molded plates (having a diameter of 8 cm, and a thickness of 1.8 mm) was prepared for evaluation of its physical properties. The light transmittance of the flat molded plate was measured in the region of 400 to 850 rm, and the obtained light transmittance was at least 85 percent.

EXAMPLE 3-2

One hundred weight parts of Organopolysiloxane 12, 5 weight parts of Organopolysiloxane 6, 10 weight parts of Organohydrogenpolysiloxane 2, and one weight part of a chloroplatinic acid isopropanol solution (having a platinum content of 0.2 percent by weight) were employed, and a molded lens having an aspheric surface on one side were obtained in the same manner as Example 3-1. Further, a flat molded plate (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 3-3

One hundred weight parts of Organopolysiloxane 3, 80 weight parts of Organopolysiloxane 2, 20 weight parts of Organohydrogenpolysiloxane 1, and 1.1 weight parts of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die under 40 atmospheric pressure and heated at 150° C. for 15 minutes. Thus a molded lens having an aspheric surface on both sides was obtained by injection molding. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 3-4

One hundred weight parts of Organopolysiloxane 4, 80 weight parts of Organopolysiloxane 2, 15 weight parts of Organohydrogenpolysiloxane-1, 5 weight parts of Organic Silicon Compound-1, and 1.1 weight parts of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding at 40 atmospheric pressures and heated at 150° C. for 15 minutes. Thus a molded lens having an aspheric surface on both sides was obtained by injection molding. Releasing properties from the die were excellent, and all the lenses were within specifications. Further, a flat molded plates (having a diameter of 8 cm, and a thickness of 1.8 mm) was prepared for evaluation of its physical properties. The light transmittance of the flat molded plate was measured in the region of 400 to 850 =m, and the obtained light transmittance was at least 85 percent.

EXAMPLE 3-5

One hundred weight parts of Organopolysiloxane 7, 10 weight parts of Organopolysiloxane 5, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a molding die for the prism sheet for a crystal liquid back light at 40 atmospheric pressures, and heated at 145° C. for 10 minutes to obtain a 1 mm thick prism sheet for liquid crystal by injection molding. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 3-6

One hundred weight parts of Organopolysiloxane 8, 20 weight parts of Organohydrogenpolysiloxane 1, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding die at 40 atmospheric pressures and heated at 145° C. for 10 minutes. Thus a molded lens having an aspheric surface on both sides was obtained by injection molding. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent.

EXAMPLE 3-7

One hundred weight parts of Organopolysiloxane 3, 20 weight parts of Organopolysiloxane 8, and one weight part of a chloroplatinic acid isopropanol solution (having a platinum content of 0.2 percent by weight) were mixed, and the resulting mixture was defoamed employing a vacuum stirrer to prepare a silicone resin composition. The resulting silicone resin composition was injected into a lens molding at 40 atmospheric pressures and heated at 145° C. for 10 minutes. Thus a molded lens having an aspheric surface on both sides was obtained by injection molding. Further, a flat molded plates (having a diameter of 8 cm, and a thickness of 1.8 mm) was prepared for evaluation of its physical properties. The light transmittance of the flat molded plate was measured in the region of 400 to 850 nm, and the obtained light transmittance was at least 85 percent. The light transmittance of the same was also measured in the region of 250 to 900 nm and the obtained light transmittance was at least 80 percent.

COMPARATIVE EXAMPLE 3-1

Fifteen weight parts of Organopolysiloxane 1, 100 weight parts of Organopolysiloxane 5, 20 weight parts of Organohydrogenpolysiloxane 1, and 1.1 weight parts of a chloroplatinic acid isopropanol solution (having a platinum content of 0.2 percent by weight) were mixed, and a molded lens was obtained in the same manner as Example 3-1. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 3-2

One hundred weight parts of Organopolysiloxane 6, 10 weight parts of Organopolysiloxane 1, 15 weight parts of Organohydrogenpolysiloxane 1, and 1.1 weight parts of a chloroplatinic acid isopropanol solution (having a platinum content of 0.2 percent by weight) were mixed, and a molded lens having aspheric surfaces on both sides was obtained in the same manner as Example 1. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 3-3

A Molded lens having an aspheric surface on both sides was obtained by molding commercially available Acrypet VH (manufactured by Mitsubishi Rayon) comprised of a polymethyl methacrylate resin for plastic according to an injection molding method. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

COMPARATIVE EXAMPLE 2-4

A molded lens was obtained by molding commercially available Ubiron S2000 (having an average molecular weight of 24,000, manufactured by Mitsubishi Gas Kagaku) comprised of a bisphenols A-type polycarbonate resin for plastic lenses employing a lens molding according to an injection molding method. Further, a flat molded plate (having a diameter of 8 cm, and a thickness of 1.8 mm) was prepared for evaluation of its physical properties. The light transmittance of the flat molded plate was measured at 250 nm, and the obtained light transmittance was no more than 5 percent.

Further, the content ratio (in percent) of tetrafunctional siloxane units composing molded lenses and various physical properties were measured employing the methods described below, and were then evaluated. Measurement of the composition ratio of basic compositional units in molded lenses:

After a molded product was frozen in liquid nitrogen, it was shattered, and then its $^{29}$Si-NMR spectra were measured employing a solid high resolution FT-NMR apparatus. In order to accurately measure mol percent of basic compositional unit, $^{29}$Si-MAS with higher quantitative accuracy was used in the measurement method. The measurement conditions are shown below.

| | |
|---|---|
| Apparatus | JEOL 270EXWB (manufactured by Nihon Denshi Co.) |
| Measurement nucleus | $^{29}$Si |
| Observed frequency | 53.54 MHz |
| Measurement range | 10,000 Hz |
| Data point | data point 8192, sampling point 2048 |
| Measurement method | $^{29}$Si-MAS |
| Pulse width | 4.2 μsecond ($^{29}$Si 90 degrees pulse) |
| Integration repetition | pd = 20 seconds |
| Integration frequency | 6,400 |
| Rotational frequency of sample | 5 kHz |
| Measurement temperature | room temperature |

Tetramethyl silane was used as the standard for the chemical shift.

Refractive index: Refractive index of a molded product was measured employing an Abbe refractometer (trade name 2T, manufactured by Atago Co.).

Double refraction: Phase difference (in nm) was measured employing an automatic double refractometer.

Light transmittance: Light transmittance in the region of 400 to 850 nm was measured employing a visible infrared spectrophotometer (Hitachi Automatic Recording Spectrophotometer). Light transmittance in the region of 250 to 900 nm was measured employing an infrared visible near infrared spectrophotometer (Nihon Bunko V570).

Heat resistance: After placing a molded product for 2 hours in a dryer at 150° C., the resulting product was observed visually as well as employing a "Film Orientation Viewer" (trade name marketed by Konica Research Lab Co.).

Then, products which did not suffer any change such as deformation, crack, surface degradation, coloration, and the like were graded as ◯, those which suffered any change were graded as X.

Hardness: in accordance with the JIS 7215, JIS-A Hardness was measured employing a durometer. Those exhibiting at least 85 were graded as ◯. Those exhibiting below 85 were graded as X because the hardness was not sufficient as a plastic lens.

Saturated water absorption: in accordance with the JIS 7209 (Method for Water Absorption Ratio of Plastic), the measurement was carried out employing a test piece having a diameter of 8 cm and a thickness of 1.8 mm.

The content ratios (in percent) of tetrafunctional units, refractive index, double refraction, hardness, heat resistance, saturated water absorption ratio (in percent) of molded plastic products in Examples 3-1 through 3-7 and Comparative Examples 3-1 through 3-4 were measured. Table 3 shows the results.

TABLE 3

| Sample No. | Content Ratio of Tetra- functional Silicon Atom (in %) | Refrac- tive Index | Double Refrac- tion (in nm) | Hard- ness | Heat Resis- tance | Satu- rated Water Absorp- tion (in %) |
|---|---|---|---|---|---|---|
| Example 3-1 | 48 | 1.52 | 9 | ◯ | ◯ | <0.1 |
| Example 3-2 | 51 | 1.49 | 10 | ◯ | ◯ | <0.1 |
| Example 3-3 | 33 | 1.51 | 10 | ◯ | ◯ | <0.1 |
| Example 3-4 | 46 | 1.54 | 9 | ◯ | ◯ | <0.1 |
| Example 3-5 | 46 | 1.52 | 9 | ◯ | ◯ | <0.1 |
| Example 3-6 | 45 | 1.41 | 8 | ◯ | ◯ | <0.1 |
| Example 3-7 | 53 | 1.36 | 9 | ◯ | ◯ | <0.1 |
| Comparative Example 3-1 | 6 | 1.48 | 11 | × | ◯ | <0.1 |
| Comparative Example 3-2 | 4 | 1.52 | 11 | × | ◯ | <0.1 |
| Comparative Example 3-3 | — | 1.49 | 18 | ◯ | × | 2.0 |
| Comparative Example 3-4 | — | 1.59 | 65 | ◯ | × | 0.3 |

Furthermore, molded lens products in Examples 3-1 through 3-4, the back light prism sheet for liquid crystal in Example 3-5 were subjected to light fastness test (at room temperature for 30 days) employing a Xenon Long Life Weather Meter (WEL-6X-HC-EC, manufactured by Suga Shikenki Co.). As a result, neither the generation of fine cracks nor coloration was observed.

According to the present invention, it was possible to provide an optical lens and an optical element which exhibit excellent basic optical properties such as refractive index, double refraction, light transmittance, and the like, as well as exhibits high heat resistance, low water absorption, high hardness, and excellent moldability.

Disclosed embodiment can be varied by a skilled person without departing from the spirit and scope of the invention.

What is claimed is:

1. An optical element, comprising:
   a silicon based resin satisfying following conditional formulas:
   (number of silicon atoms residing as $R1SiO_{3/2}$ in the silicon based resin)/(total number of silicon atoms in the silicon based resin)>0
   (number of silicon atoms residing as $Si_{4/2}$ in the silicon based resin)/(total number of silicon atoms in the silicon based resin)>0
   {(number of silicon atoms residing as $R1SiO_{3/2}$ in the silicon based resin)+(number of silicon atoms residing as $SiO_{4/2}$ in the silicon based resin)}×100/(total number of silicon atoms in the silicon based resin)>10%
   wherein R1 represents a hydrogen atom, a hydroxyl group, an amino group, a halogen atom or an organic group.

2. The optical element of claim 1, wherein the optical element is an optical lens.

3. The optical element of claim 2, wherein the optical lens comprises optical surfaces at least one of which is shaped in a aspherical surface.

4. The optical element of claim 1, wherein the silicon based resin satisfies following conditional formulas:
   (number of silicon atoms residing as $R1SiO_{3/2}$ in the silicon based resin)/(total number of silicon atoms in the silicon based resin)>0
   (number of silicon atoms residing as $SiO_{4/2}$ in the silicon based resin)/(total number of silicon atoms in the silicon based resin)>0
   {(number of silicon atoms residing as $R1SiO_{3/2}$ in the silicon based resin)+(number of silicon atoms residing as $SiO_{4/2}$ in the silicon based resin)}×100/(total number of silicon atoms in the silicon based resin)≧20%.

5. The optical element of claim 1, wherein the silicon based resin satisfies a following conditional formula:
   (number of silicon atoms residing as $R1SiO_{3/2}$ in the silicon based resin)≧(number of silicon atoms residing as $SiO_{4/2}$ in the silicon based resin).

6. The optical element of claim 1, wherein the silicon based resin satisfies a following conditional formula:
   (number of silicon atoms residing as $R1SiO_{3/2}$ in the silicon based resin)<(number of silicon atoms residing as $SiO_{4/2}$ in the silicon based resin).

7. The optical element of claim 1, wherein the silicon based resin satisfies a following conditional formula:
   5%≦(number of silicon atoms residing as $R1SiO_{3/2}$ in the silicon based resin)×100/(total number of silicon atoms residing as $SiO_{4/2}$ in the silicon based resin)≦90%.

8. The optical element of claim 1, wherein 15 to 100 mol % of substituents bonded to silicon atoms contained in the silicon based resin is an aromatic groups.

9. The optical element of claim 1, wherein 20 to 100 mol % of substituents bonded to silicon atoms contained in the silicon based resin is an alkyl group.

10. The optical element of claim 9, wherein the alkyl group is a methyl group.

11. The optical element of claim 1, wherein 20 to 100 mol % of substituents bonded to silicon atoms contained in the silicon based resin is a hydrogen atom.

12. The optical element of claim 1, wherein a hardness of the optical element according to JIS-A is not smaller than 85.

13. The optical element of claim 1, wherein the silicon based resin satisfies following conditional formulas:
    (number of silicon atoms residing as $R1SiO_{3/2}$ in the silicon based resin)/(total number of silicon atoms in the silicon based resin)>0
    (number of silicon atoms residing as $SiO_{4/2}$ in the silicon based resin)/(total number of silicon atoms in the silicon based resin)≦0
    {(number of silicon atoms residing as $R1SiO_{3/2}$ in the silicon based resin)+(number of silicon atoms residing as $SiO_{4/2}$ in the silicon based resin)}×100/(total number of silicon atoms in the silicon based resin)≧10%.

14. The optical element of claim 13, wherein the optical element is an optical lens whose minimum effective radius is 0.03 mm to 3.00 mm.

15. The optical element of claim 13, wherein the optical element is an optical lens whose volume is not larger than 100 mm³.

16. The optical element of claim 1, wherein the silicon based resin satisfies a following conditional formula:
    5%≦(number of silicon atoms residing as $R2R3SiO_{2/2}$ in the silicon based resin)×100/(total number of silicon atoms in the silicon based resin)≦60%
    wherein R2 and R3 are the same or different from each other and and R2 and R3 represent a hydrogen atom, a hydroxyl group, an amino group a halogen atom or an organic group.

17. The optical element of claim 1, wherein the silicon based resin satisfies following conditional formulas:
    (number of silicon atoms residing as $R1SiO_{3/2}$ in the silicon based resin)×100/(total number of silicon atoms in the silicon based resin)=0%
    (number of silicon atoms residing as $SiO_{4/2}$ in the silicon based resin)×100/(total number of silicon atoms in the silicon based resin)≧10%.

18. The optical element of claim 1, wherein the silicon based resin satisfies a following conditional formula:
    10%≦(number of silicon atoms residing as $SiO_{4/2}$ in the silicon based resin)×100/(total number of silicon atoms in the silicon based resin)≦90%.

19. The optical element of claim 18, wherein the silicon based resin satisfies a following conditional formula:
    30%≦(number of silicon atoms residing as $SiO_{4/2}$ in the silicon based resin)×100/(total number of silicon atoms in the silicon based resin)≦70%.

20. The optical element of claim 1, wherein the silicon based resin is a silicone resin.

* * * * *